(12) United States Patent
Sensui et al.

(10) Patent No.: US 7,650,696 B2
(45) Date of Patent: Jan. 26, 2010

(54) MANUFACTURING METHOD FOR BEARING UNIT FOR SUPPORT WHEEL

(75) Inventors: Natsuki Sensui, Kanagawa (JP); Masaru Hashida, Kanagawa (JP); Nobuhiro Nakazawa, Kanagawa (JP); Tatsuo Wakabayashi, Kanagawa (JP)

(73) Assignee: NSK Ltd., Tokyo (JP)

( * ) Notice: Subject to any disclaimer, the term of this patent is extended or adjusted under 35 U.S.C. 154(b) by 58 days.

(21) Appl. No.: 11/392,617

(22) Filed: Mar. 30, 2006

(65) Prior Publication Data

US 2006/0261667 A1 Nov. 23, 2006

(30) Foreign Application Priority Data

Mar. 30, 2005 (JP) ............... P.2005-097432
Feb. 28, 2006 (JP) ............... P.2006-051971

(51) Int. Cl.
*B21K 1/40* (2006.01)

(52) U.S. Cl. ............... 29/894.362; 29/894.36; 29/527.6; 82/1.11; 301/105.1; 451/63

(58) Field of Classification Search ............... 29/894.36, 29/894.362, 527.6; 82/1.11; 451/63; 301/105.1
See application file for complete search history.

(56) References Cited

U.S. PATENT DOCUMENTS

| | | | | |
|---|---|---|---|---|
| 5,620,263 A | * | 4/1997 | Ohtsuki et al. ............... | 384/517 |
| 5,706,567 A | * | 1/1998 | Sakagami et al. ............ | 29/527.6 |
| 5,725,464 A | * | 3/1998 | Pallmann .................... | 483/1 |
| 5,842,388 A | * | 12/1998 | Visser et al. ................ | 82/1.11 |
| 6,071,180 A | * | 6/2000 | Becker ....................... | 451/63 |
| 6,364,426 B1 | * | 4/2002 | Horne et al. ............... | 301/105.1 |
| 6,415,508 B1 | * | 7/2002 | Laps .......................... | 29/894.362 |
| 6,428,214 B2 | * | 8/2002 | Tajima et al. ............... | 384/544 |
| 6,702,398 B2 | * | 3/2004 | Laps .......................... | 301/105.1 |
| 6,848,832 B2 | * | 2/2005 | Takemura et al. ........... | 384/625 |
| 7,281,424 B2 | * | 10/2007 | Sakamoto ................... | 73/494 |

FOREIGN PATENT DOCUMENTS

JP 2001-233001 A 8/2001

\* cited by examiner

*Primary Examiner*—Rick K Chang
(74) *Attorney, Agent, or Firm*—Sughrue Mion, PLLC

(57) ABSTRACT

After a hub supporting member is mounted on an end portion of a spindle, correction work is applied to a ring-shaped supporting surface which is an end face of the hub supporting member, whereby perpendicularity of the supporting surface relative to a rotational center axis of the spindle is improved. Thereafter, while the hub main body is made to rotate together with the spindle in such a state that the mounting surface abuts with the supporting surface, grinding finishing work is applied to a cylindrical surface portion (a portion on which inner rings are fitted) of the hub main body. As a result, the perpendicularity of the mounting surface relative to the geometric center axis of the cylindrical surface portion is improved.

10 Claims, 28 Drawing Sheets

MANUFACTURING METHOD FOR BEARING UNIT FOR SUPPORT WHEEL

The present invention claims foreign priority to Japanese patent application No. P.2005-097432, filed on Mar. 30, 2005 and No. P.2006-051649, filed on Feb. 28, 2006, the contents of which are incorporated herein by reference.

BACKGROUND OF THE INVENTION

1. Field of the Invention

This invention relates to an improved wheel supporting bearing unit which is used to rotatably support a wheel and a brake rotary member relative to a suspension system and a manufacturing method for the same.

2. Description of the Background Art

A wheel supporting bearing unit has conventionally been in use to rotatably support an automotive wheel relative to a suspension system. FIG. 17 shows, as a first example of a conventionally known wheel supporting bearing unit like this, a wheel supporting bearing unit for driving wheels (front wheels of an FF vehicle, rear wheels of FR and RR vehicles, and all wheels of a 4WD vehicle). This wheel supporting bearing unit includes an outer ring 1, a hub 2 and a plurality of tapered rollers 3, 3 each constituting a rolling element. Among these, the outer ring 1 has a primary and secondary outer ring raceways 4a, 4b which are each formed on an inner circumferential surface into a coned recessed surface and a connecting flange 5 which is formed on an outer circumferential surface thereof. The inclined directions of the primary and secondary outer ring raceways 4a, 4b are opposite to each other.

In addition, the hub 2 is made up of a combination of a hub main body 6 and a primary and secondary inner rings 7a, 7b. Of these, the hub main body 6 has a mounting flange 8 which is formed at a portion on an outer circumferential surface thereof which is close to an outboard end (in this application, axially outboard means outboard in a width direction of a vehicle in such a state that the bearing unit is mounted on the vehicle. The left-hand side in FIGS. 6, 17 to 28 and the upper side in FIGS. 7, 9 correspond to the axially outboard. In contrast, the right-hand side in FIGS. 6, 17 to 28 and the lower side in FIGS. 7, 9 denote axially inboard) for fixedly supporting a wheel and a brake rotor which is a brake rotary member, a cylindrical surface portion 9 which is formed from a central portion to an inboard end portion on the outer circumferential surface thereof and a splined hole 10 which is formed in a central portion thereof. In addition, at a plurality of locations in a circumferential direction of the mounting flange 8 (for example, five locations which are positioned circumferentially at equal intervals), circular holes 11, 11, which are supporting holes, are formed in such a manner as to axially pass through the flange at portions which are equidistant from a center axis of the mounting flange 8 (the hub 6). Then, studs 12, 12, which are rod-shaped members, are fitted and supported in these circular holes 11, 11 through press fit. These studs 12, 12 are used to fixedly support the wheel and the brake rotor on the mounting flange 8.

In addition, the primary inner ring 7a has a primary inner ring raceway 13a which is formed into a coned raised surface on an outer circumferential surface thereof, and the secondary ring 7b has a secondary inner ring raceway 13b which is formed into a coned raised surface on an outer circumferential surface thereof. Additionally, these primary and secondary inner rings 7a, 7b have small collar portions 14 and large collar portions 15 which are formed at small diameter side end portions and large diameter side end portions, respectively, of the primary and secondary inner ring raceways 13a, 13b in such a manner as to protrude radially outwards, as well as extend along the full circumference of the primary and secondary inner rings, respectively. In addition, inner circumferential surfaces of the primary and secondary inner rings 7a, 7b are each formed into a simple cylindrical surface. These primary and secondary inner rings 7a, 7b, which are configured described above, are fitted and supported on the cylindrical surface portion 9 of the hub main body 6 through interference fit in such a manner that small diameter side end faces thereof are brought into abutment with each other. Additionally, in this state, a large diameter side end face of the primary inner ring 7a is abutted against an stepped surface 16 provided at a proximal end portion of the cylindrical surface portion 9, and a large diameter side end face of the secondary inner ring 7b protrudes axially further inwards than an inner end face of the hub main body 6. The plurality of tapered rollers 3, 3 are rollingly provided between the primary and secondary outer ring raceways 4a, 4b and the primary and secondary inner ring raceways 13a, 13b, respectively.

When assembling the wheel supporting bearing unit on to a motor vehicle, as shown in the figure, a splined shaft 18, which is a drive axle fixedly provided at a central portion of an outboard end face of a constant velocity joint outer ring 17, is inserted into the splined hole 10. An outside diameter side portion of the outboard end face of the constant joint outer wheel 17 is abutted against the large diameter side end face of the secondary inner ring 7b. Then, in this state, a nut 20 is screwed on an externally threaded portion 19 provided at a distal end portion of the splined shaft 18 which protrudes from the splined hole 10, and tightened further thereon. Due to this configuration, the splined shaft 18 and the hub 2 are coupled and fixed to each other, and by imparting forces to the primary and secondary inner rings 7a, 7b which acts to make them approach each other with respect to the axial direction, a proper preload is imparted to the individual tapered rollers 3, 3. Note that, large diameter side end faces (or end edges) of the individual tapered rollers 3, 3 are guided to respective inner faces 21, 21 of the large collar portions 15, 15 which constitute collar faces, respectively. The connecting flange 5 is coupled and fixed to a knuckle 22 which makes up the suspension system using a bolt 23. A wheel and a brake rotor, neither of which is shown, are fixedly supported on the mounting flange 8 using the individual studs 12, 12. In a case where the illustrated construction, an axially outboard surface of the mounting flange 8 constitutes a mounting surface 24 of the brake rotor.

Next, FIG. 18 shows a second example of a conventionally known wheel supporting bearing unit. In the case of this second example of the wheel supporting bearing unit, a clamping portion 25 is formed by plastically deforming in a radially outward direction a cylindrical portion which protrudes axially further inboards than a large diameter side end face of a secondary inner ring 7b at an inboard end portion of a hub main body 6a. In addition, the large diameter side end face of the secondary inner ring 7b is pressed towards an stepped surface 16 provided on an outer circumferential surface of an intermediate portion of the hub main body 6a by the clamping portion 25 so formed. The configurations and functions of the other portions of this example are the same as those of the first embodiment.

Next, FIG. 19 shows a wheel supporting bearing unit for non-driving or driven wheels (rear wheels of an FF vehicle and front wheels of FR and RR vehicles) as a third example of a conventionally known wheel supporting bearing unit. Since this wheel supporting bearing unit of the third example is such as for driven wheels, a splined hole is not provided in a central portion of a hub main body 6b. Instead, an externally threaded portion 26 is provided at an inboard end portion of the hub main body 6b. Then, a large diameter side end face of an inner ring 7b is pressed towards an outer circumferential surface of an intermediate portion of the hub main body 6b by a nut 27 which is screwed on the externally threaded portion 26 and is then tightened further. The configurations and functions of the other portions are the same as those of the first example. Note that although not shown in the drawings, also in the event of the wheel supporting bearing unit for driven wheels, as with the second example that has been described before, there may exists a case where a clamping portion is formed at an inboard end portion of the hub main body so as to press a large diameter side end face of a secondary inner ring by the clamping portion so formed.

Next, FIGS. 20 to 22 show fourth to sixth examples of conventionally known wheel supporting bearing units, respectively. In the case of the first to third examples shown in FIGS. 17 to 19, the primary inner ring raceway 13a is formed on the outer circumferential surface of the primary inner ring 7a fitted on the intermediate portion of the hub main body 6, 6a, 6b. In contrast to this, in the case of the fourth to sixth examples shown in FIGS. 20 to 22, respectively, a primary inner ring raceway 13b is formed direct on an outer circumferential surface of a hub main body 6c to 6e. The configurations and functions of the other portions are the same as those of the aforesaid first to third examples.

Next, FIGS. 23 to 28 show seventh to twelfth examples of conventionally known wheel supporting bearing units, respectively. In the case of the first to sixth examples shown in FIGS. 17 to 22, the tapered rollers 3, 3 are used as a plurality of rolling elements. In contrast to this, in the case of the seventh to twelfth examples shown in FIGS. 23 to 28, balls 28, 28 are used as a plurality of rolling elements. In association with this, bus bars of primary and secondary outer ring raceways 4c, 4d and primary and secondary inner ring raceways 13c, 13d are formed into an arc-like shape. The other configurations and functions of the examples are the same as those of the first to sixth examples. Note that in general, the wheel supporting bearing units utilizing the tapered rollers 3, 3 as the plurality of rolling elements are used as wheel supporting bearing units for motor vehicles of relatively heavy weights, whereas the wheel supporting bearing units utilizing balls 28, 28 are used as wheel supporting bearing units for motor vehicles of relatively light weights.

Incidentally, in the event that the rotational run-out (an axial run-out (displacement amount) in association with rotation) of the brake rotor increases while the vehicle is driven, abnormal noise referred to as judder is generated when the brakes are applied. In order to prevent the occurrence of the judder due to such a cause, the rotational run-out of the brake rotor needs to be suppressed. In order to suppress the rotational run-out of the brake rotor, perpendicularity of the mounting surface 24 of the brake rotor relative to the rotational center axis of the hub 2, 2a to 2k and plane accuracy of the mounting surface 24 needs to be improved, respectively.

Of these, the plane accuracy of the mounting surface 24 is deteriorated by elastic deformation or plastic deformation of the mounting surface 24 associated with the press-fit fixation of the individual studs 12, 12. In view of these situations, Japanese Patent Unexamined Publication No. JP-A-2001-233001 describes a technique of improving the plane accuracy of the mounting surface 24 by machining to a part of the axially outboard surface of the mounting flange 8 which constitutes the mounting surface 24 (portions of the outboard surface shown as shaded with inclined lines in FIG. 29 which are offset radially inwards and outwards from a ring-like portion where the studs 12, 12 are arranged).

In addition, the perpendicularity of the mounting surface 24 relative to the rotational center axis of the hub 2, 2a to 2k is deteriorated by virtue of the deterioration of the perpendicularity of the geometric center axis of the cylindrical surface portion 9 formed on the outer circumferential surface of the hub main body 6, 6a to 6k {and the primary inner ring raceway 13a, 13c (and the inner surface 21 of the large collar portion 15)} (the parallelism of the individual portions) relative to the mounting surface 24. In view of these situations, the aforesaid Japanese unexamined patent publication, JP-A-2001-233001, further describes a technique of improving the plane accuracy of the mounting surface 24 in the way described above and thereafter improving the perpendicularity of the geometric center axis of the cylindrical surface portion 9 {and the primary inner ring raceway 13a, 13c (and the inner surface 21 of the large collar portion 15)} (the parallelism of the individual portions) relative to the mounting surface 24 by performing finishing work on the cylindrical surface portion 9 {and the primary inner ring raceway 13a, 13c (and the inner surface 21 of the large collar portion 15)} utilizing the mounting surface 24 as a reference surface.

In addition, the perpendicularity of the mounting surface 24 relative to the rotational center axis of the hub 2, 2a to 2k is deteriorated by virtue of the deterioration of rotational accuracy of a double row bearing which makes up the wheel supporting bearing unit. In order to improve the rotational accuracy of the double row bearing, it is important to, with respect to the primary and secondary inner rings 7a (7c), 7b (7d), improve the perpendicularity of the geometric center axis of the cylindrical inner circumferential surfaces of the inner races and the inner ring raceways formed on the outer circumferential surfaces of the inner races (and the inner surfaces 21 of the large collar portions 15) (the parallelism of these portions) relative to the large diameter side end faces of the inner races. In addition, in the case of the construction in which the primary inner ring raceway 13a, 13c is formed direct on the outer circumferential surface of the hub main body 6c to 6e, 6i to 6k, it is also important to improve the perpendicularity of the geometric center axis of the primary inner ring raceway 13a, 13c (and the inner surface 21 of the large collar portion 15) and the cylindrical surface portion 9 (the parallelism of these portions) relative to the mounting surface 24. In addition, in these cases, too, as with the technique described in JP-A-2001-233001, it is considered that the perpendicularity (or the parallelism) can be improved by finishing the large diameter side end faces of the primary and secondary inner rings 7a (7c), 7b (7d) and the mounting surface 24 with good plane accuracy and thereafter performing finishing work on the primary and secondary inner ring raceways 13a (13c), 13b (13d) (and the inner surfaces 21 of the large collar portions 15) and the cylindrical surface portion 9 utilizing the large diameter side end faces or the mounting surface 24 so finished as a reference surface.

As with the technique described in the aforesaid Japanese unexamined patent publication, JP-A-2001-233001, however, even in the event that the finishing work is performed on the individual portions utilizing as the reference surface the mounting surface 24 which is finished with good plane accuracy, in case a supporting surface of a support member which makes up a machining apparatus is not square to the rotational center axis of a spindle on which the support member is mounted, it becomes difficult to improve the perpendicularity (or the parallelism). Normally, the shape and dimensions of the support member are determined in design such that the supporting surface becomes square to the rotational center axis of the spindle in such a state that the support member is mounted on the spindle. In fact, however, since there exist a production error of the support member and a mounting error of the support member on to the spindle, there may occur a risk where the perpendicularity of the supporting surface relative to the spindle gets worse. When the supporting surface gets worse like this, it becomes difficult to improve the perpendicularity (parallelism).

SUMMARY OF THE INVENTION

In view of the aforesaid situations, an object of the invention is to provide a wheel supporting bearing unit which can suppress sufficiently the rotational run-out of a mounting surface where a brake rotor is mounted relative to the rotational center axis of a hub and a method for manufacturing the same.

According to the invention, there is provided a method for manufacturing a wheel supporting bearing unit comprising:

a hub comprising:
  a mounting flange which is provided integrally on an outer circumferential surface of an axially outboard portion a hub main body and to which a wheel and a brake rotary member are mounted;
  an axially outboard inner ring raceway which is formed direct on an outer circumferential surface of an axially intermediate portion of the hub main body; and
  an axially inward inner ring raceway formed on an inner ring which is fitted on a cylindrical surface portion formed an outer circumferential surface of an axially inward portion of the hub main body,
  wherein the axially outboard inner ring raceway and the axially inboard inner ring raceway make up a double row inner ring raceway;
an outer ring having a double row outer ring raceway on an inner circumferential surface thereof; and
a plurality of rolling elements which are provided between the double row outer ring raceway and each of the inner ring raceways, respectively,
the method for manufacturing the wheel supporting bearing unit comprising the steps of:
  (A) grinding a supporting surface provided on an axial end face of an inner ring supporting member, in a state of mounting the inner ring supporting member on a spindle adapted to be driven to rotate, while rotating the inner ring supporting member together with the spindle, to thereby improve perpendicularity of the supporting surface relative to a rotational center axis of the spindle, and
  grinding at least the axially inboard inner ring raceway formed on the outer circumferential surface of the inner ring and a cylindrical inner circumferential surface of the inner ring, respectively, in a state of abutting an axially end face of the inner ring with the supporting surface, while rotating the inner ring together with the spindle and the inner ring supporting member, or
  (B) grinding a supporting surface provided on an axial end face of a hub supporting member, in a state of mounting the hub supporting member on a spindle adapted to be driven to rotate, while rotating the hub supporting member together with the spindle, to thereby improve perpendicularity of the supporting surface relative to a rotational center axis of the spindle, and
  grinding at least the axially outboard inner ring raceway and the cylindrical surface portion onto which the inner ring is fitted, respectively, in a state of abutting an axially outboard surface of the mounting flange with the supporting surface, while rotating the hub main body together with the spindle and the hub supporting member.

According to another aspect of the present invention, there is provided a method for manufacturing a wheel supporting bearing unit comprising:

a hub comprising:
  a mounting flange which is provided integrally on an outer circumferential surface of an axially outboard portion of a hub main body and to which a wheel and a brake rotary member are mounted;
  a cylindrical surface portion which is formed on an outer circumferential surface of the hub main body from an axially intermediate portion to inboard portion thereof;
  a primary inner ring which is fitted onto the cylindrical surface portion formed at the axially intermediate portion of the hub main body, an axially outboard inner raceway being formed on an outer circumferential surface of the primary inner ring; and
  a secondary inner ring which is fitted onto the cylindrical surface portion formed at the axially inboard portion of the hub main body, an axially inboard inner raceway being formed on an outer circumferential surface of the secondary inner ring,
  wherein the axially outboard inner ring raceway and the axially inboard inner ring raceway make up a double row inner ring raceway;
an outer ring having a double row outer ring raceway on an inner circumferential surface thereof; and
a plurality of rolling elements which are provided between the outer ring raceway and each of the inner ring raceways, respectively,
the method for manufacturing the wheel supporting bearing unit comprising the steps of:
  (A) grinding a supporting surface provided on an axial end face of an inner ring supporting member, in a state of mounting the inner ring supporting member mounted on a spindle adapted to be driven to rotate, while rotating the inner ring supporting member together with the spindle, to thereby improve perpendicularity of the supporting surface relative to a rotational center axis of the spindle, and
  grinding at least the axially inboard inner ring raceway formed on the outer circumferential surface of the primary inner ring or the secondary inner ring and the cylindrical inner circumferential surface of the primary inner ring or the secondary inner ring, respectively, in a state of abutting an axially end face of the primary inner ring or the secondary inner ring with the supporting surface, while rotating the primary inner ring or the secondary inner ring together with the spindle and the inner ring supporting member, or
  (B) grinding a supporting surface provided on an axial end face of a hub supporting member, in a state of mounting the hub supporting member on a spindle adapted to be driven to rotate, while rotating the hub supporting member together with the spindle, to thereby improve perpendicularity of the supporting surface relative to a rotational center axis of the spindle, and
  grinding at least the individual cylindrical surface portions on which the primary and secondary inner rings are fitted, respectively, in a state of abutting an axially outboard surface of the mounting flange with the supporting surface, while rotating the hub main body together with the spindle and the hub supporting member.

According to the wheel supporting bearing unit and the method for manufacturing the same of the invention which are described above, by carrying out the step described under (A), the perpendicularity of the geometric center axis of the cylindrical inner circumferential surface of the inner ring and the inner ring raceway formed on the outer circumferential surface of the inner ring (the parallelism of these portions) relative to the axially end face of the inner ring can be improved, respectively.

In addition, by carrying out the step described under (B), the perpendicularity of the geometric center axis (the parallelism) of the cylindrical surface portion, onto which the outboard inner ring raceway or the primary inner ring is fitted, and the cylindrical surface portion, onto which the secondary inner ring is fitted, relative to the axially outboard surface of the mounting flange, are improved, respectively.

Consequently, the rotational run-out {the axial run-out (displacement amount) in association with rotation)} of the axially outboard surface of the mounting flange relative to the rotational center axis of the hub can be suppressed. As a result, the rotational run-out of the brake rotor which is mounted on the outboard surface can be suppressed to thereby suppress the occurrence of judder when the brakes are applied.

When carrying out the invention, preferably, in at least either of the steps (A), (B), grinding (correcting work) is applied to the supporting surface utilizing a grinding wheel mounted on a wheel spindle of a grinding machine that is used when applying grinding (finishing work) to the inner ring or the hub main body which is a workpiece in the relevant step.

Grinding is carried out in this way, the used grinding wheel does not have to be changed between when the grinding (finishing work) is applied to the supporting surface and when the grinding (finishing work) is applied to the inner ring or the hub main body. Due to this, both the reduction in working facility cost and increase in efficiency at the production line can be accomplished.

In addition, in a normal wheel supporting bearing unit, which is a target to which the invention is applied, supporting holes into which rod-shaped members are press fitted or screwed to support a wheel and a brake rotary member are provided in the mounting flange at a plurality of locations which lie in a circumferential direction of the mounting flange and equidistant from the center axis of the mounting flange. According to this construction, preferably, in the step (B), the supporting surface of the hub supporting member is brought into abutment with the axially outboard surface of the mounting flange at only the portion (referred to as a designated portion) which lies radially outwards of a pitch circle of the supporting holes and radially further outwards than the portion of the outer circumferential surface of the hub main body to be grinded.

With the grinding being carried out in this way, while suppressing the increase in area of the portion on the axially outboard surface of the mounting flange which constitutes the reference surface, the supporting rigidity of the hub main body can be secured sufficiently. Due to this, while suppressing the increase in working cost, the working accuracy at the portion to be worked can be improved. When carrying out the invention, however, in the step (B), the supporting surface can also be brought into abutment with any portion of the axially outboard surface of the mounting flange other than the designated portion.

The invention can be applied to a wheel supporting bearing unit in which a plurality of rolling elements are tapered rollers; and a collar surface for guiding axial end edges of the tapered rollers is provided along at least each of end portions of a double inner ring raceway which are axially opposite to each other in such a manner as to extend around the full circumference of the inner ring. In this case, preferably, in the steps (A) and (B), grinding is applied to the inner raceways individually, and grinding is also applied to each of the collar surfaces.

With the grinding being carried out in this way, the perpendicularity of the geometric center axis of the collar surfaces (the parallelism of the collar surfaces) relative to the axial end face of the inner ring or the axially outboard surface of the mounting flange can be improved. Due to this, the rotational run-out of the axially outboard surface of the mounting flange relative to the rotational center axis of the hub can be suppressed sufficiently.

In addition, the invention can be applied to a wheel supporting bearing unit in which a plurality of rolling elements are balls.

DETAILED DESCRIPTION OF THE PREFERRED EMBODIMENTS

Embodiment 1

Figure 1:
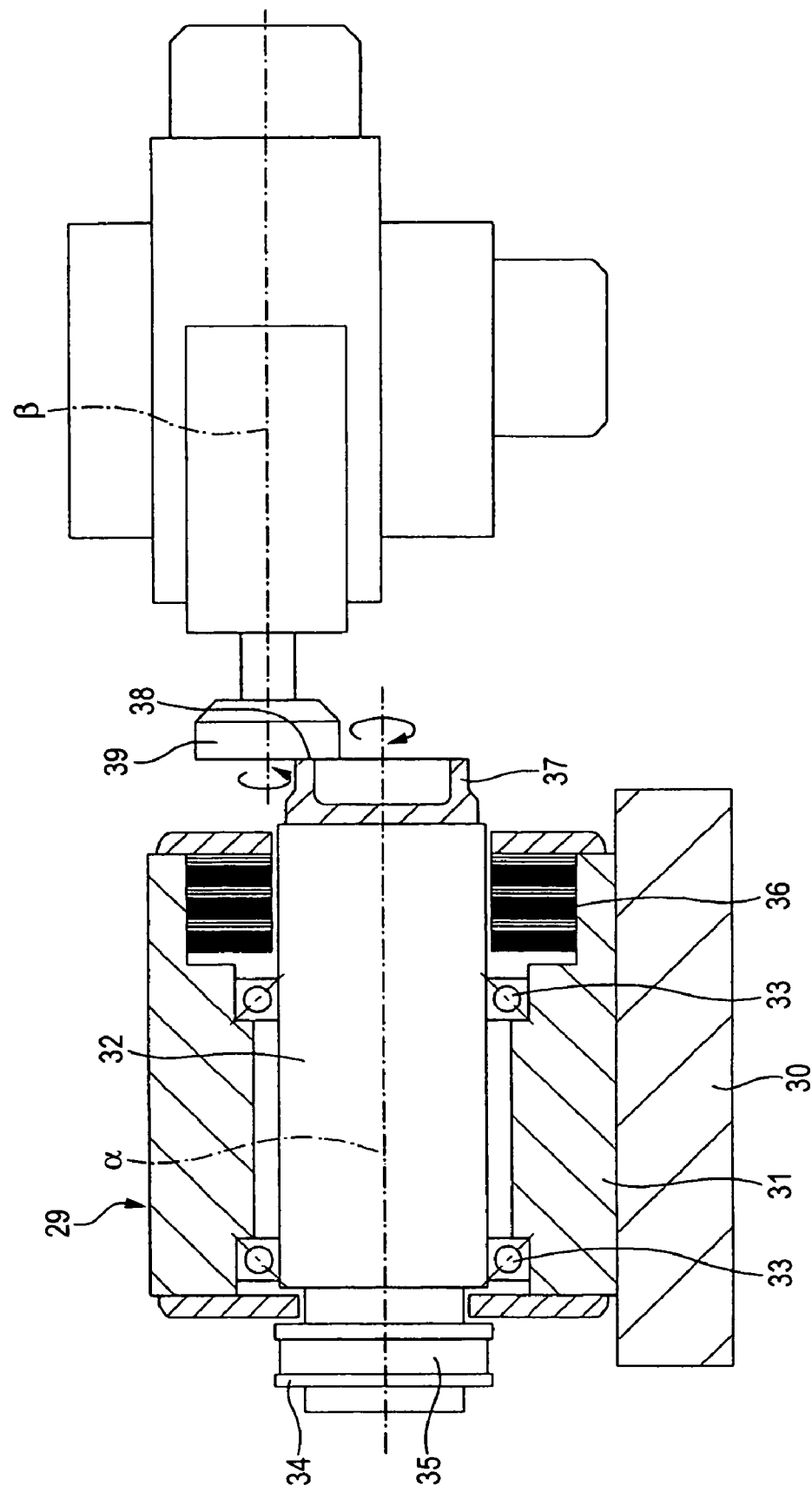
FIG. 1 is a sectional view showing a step of applying correction work to a supporting surface of an inner ring supporting member of Embodiment 1 of the invention.

FIGS. 1 to 6 shown Embodiment 1 of the invention. Note that a feature of this embodiment resides in that in a process of manufacturing a wheel supporting bearing unit shown in FIG. 18, a step of applying finishing work to a hub main body 6*a* and primary and secondary inner rings 7*a*, 7*b* is devised. Since the overall construction and function of the wheel supporting bearing unit are such as described before, repeated illustration and description thereof will be omitted or simplified, and characteristic parts of the embodiment will mainly be described.

Firstly, a process of applying finishing work to the primary and secondary inner rings 7*a*, 7*b* will be described by reference to FIGS. 1 to 4. In this embodiment, a spindle headstock 29 is used to perform this step. In this spindle headstock 29, a steel spindle 32 is rotatably supported by a pair of bearings 33, 33 inside a housing 31 fixed to a bed 30. A driven pulley 34 is fixed to a portion of a proximal end portion (a left end portion in FIGS. 1 to 4) of the spindle 32 which protrudes to the outside of the housing 31 concentrically with the spindle 32. An endless belt 35 is extended between this driven pulley 34 and a driving pulley fixed to a rotational shaft of a driving motor, not shown, whereby the spindle 32 is made free to be driven to rotate by the driving motor. An annular magnet coil 36 is supported on an inner circumferential surface of the housing 31 at a portion which surrounds a distal end portion (a right end portion in FIGS. 1 to 4) of the spindle 32. An inner circumferential surface of this magnet coil 36 is made to face closely an outer circumferential surface of the distal end portion of the spindle 32.

When applying finishing work to the primary and secondary inner rings 7*a*, 7*b* using the spindle headstock 29 described above, firstly, as shown in FIG. 1, a steel, bottomed cylindrical inner ring supporting member 37 is mounted (fixedly coupled) on the distal end portion of the spindle 32 in such a manner as to be concentric with the spindle 32. As this occurs, the inner ring supporting member 37 is preferably fixed to the distal end portion of the spindle 32 by fastening a bolt or the like. This is because when replacing the supporting member fixed to the distal end portion of the spindle 32 with another supporting member (a set replacement is carried out), the replacement work has to be completed easily and within a short period of time. In any case, in this state, a ring-like distal end face (a right end face in FIGS. 1 to 4) of the inner ring supporting member 37 is made to be a supporting surface 38 for supporting a large diameter side end face (a reference surface when carrying out finishing work) of each of the primary and secondary inner rings 7*a*, 7*b*. In order to finish the primary and secondary inner rings 7*a*, 7*b* to desired shapes and dimensions, the perpendicularity of the supporting surface 38 relative to a rotational center axis $\alpha$ of the spindle 32 needs to be improved. Due to this, in this embodiment, in such a state that the inner ring supporting member 37 is mounted on the distal end portion of the spindle 32 in the way described above, the shape and dimensions of the inner ring supporting member 37 are determined in design such that the perpendicularity of the supporting surface 38 relative to the rotational center axis $\alpha$ of the spindle 32 is improved. However, in fact, since there may exist production errors and assembling errors, there exists a possibility that the perpendicularity of the supporting surface 38 relative to the rotational center axis $\alpha$ of the spindle 32 is deteriorated in such a state that the inner ring supporting member 37 is mounted on the distal end portion of the spindle 32 as described above.

Figure 2:
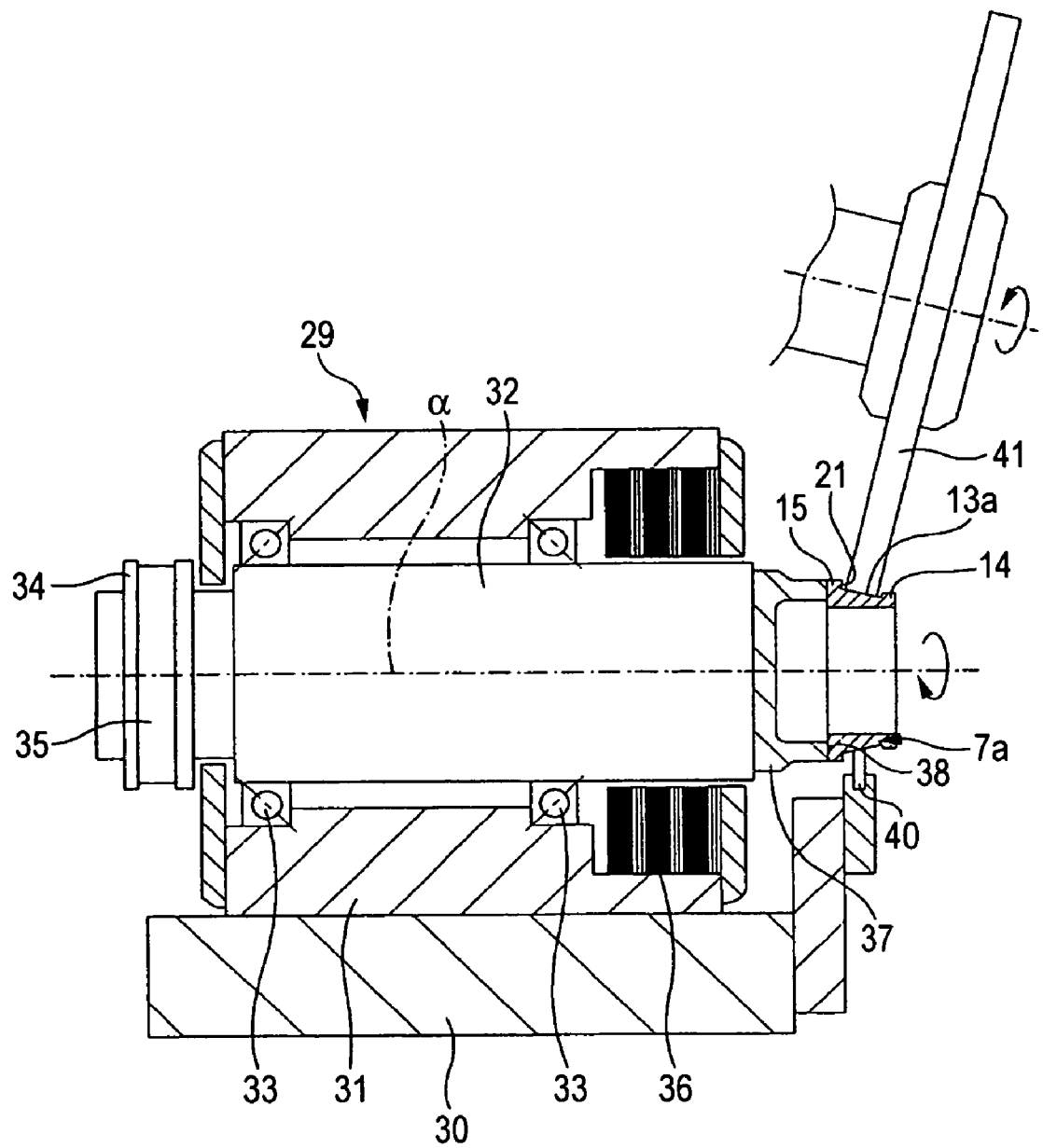
FIG. 2 is a sectional view showing a step of applying grinding to an inner ring raceway of Embodiment 1 of the invention.

Then, in the case of this embodiment, after the inner ring supporting member 37 is mounted on the distal end portion of the spindle 32 in the way described above, in order to improve the perpendicularity of the supporting surface 38 relative to the rotational center axis $\alpha$ of the spindle 32, correction work is applied to the supporting surface 38. Due to this, specifically speaking, as shown in FIG. 1, while rotating the inner ring supporting member 37 together with the spindle 32 at high speed, a distal end face (a plane normal to an axis $\beta$ which is parallel to the rotational center axis $\alpha$ of the spindle 32 which rotates about the axis $\beta$) of a grinding wheel 39 rotating at high speed, is brought into press abutment with a circumferential portion of the supporting surface 38. By doing this, grinding is applied to the supporting surface 38, so as to improve the perpendicularity of the supporting surface 38 relative to the rotational center axis $\alpha$ of the spindle 32. Note that when the inventor actually applied the grinding to the supporting surface 38 to thereby improve the perpendicularity of the supporting surface 38 relative to the rotational center axis $\alpha$ of the spindle 32, the rotational run-out (the displacement amount in a direction of the center axis $\alpha$ in association with rotation) of the supporting surface 38 could be suppressed to 1 μm or less easily. In addition, in the case of the embodiment, the correction work to the supporting surface 38 is, as is described above, carried out immediately after the inner ring supporting member 37 is fixed to the distal end portion of the spindle 32 (when a set replacement is carried out). Thereafter, the correction work is performed as required in the event that the rotational run-out of the primary and secondary inner rings 7*a*, 7*b* (the axial displacement amount of a side which is axially opposite to the supporting surface 38 when each of the inner races 7*a* (7*b*) is rotated on an inner ring raceway 13*a* (13*b*) as a base) which is measured every time finishing work is applied to the primary and secondary inner rings 7a, 7b, which will be described below, or the rotational run-out of the supporting surface 38 exceeds a permissible value.

Where the correction work is applied to the supporting surface 38 in the way described above, following this, finishing work is carried out on the primary and secondary inner rings 7a, 7b. For example, when applying finishing work to the primary inner ring 7a, a large diameter side end face of the primary inner ring 7a is, as shown in FIG. 2, brought into abutment with the supporting surface 38 along the full circumference thereof, a shoe 40 supported on the bed 30 is brought into sliding contact with a circumferential portion of a primary inner ring raceway 13a formed on an outer circumferential surface of the primary inner ring 7a. In association with this, the large diameter side end face of the primary inner ring 7a is made to be attracted to be secured to the supporting surface 38 by means of an electromagnetic force excited by the magnetic coil 36. Then, in this state, the inner ring 7a is rotated together with the spindle 32 at high speed. Note that in this embodiment, in this state, the geometric center axis of the primary inner ring 7a is made to be offset on the order of 0.2 mm with respect to the rotational center axis $\alpha$ of the spindle 32. Thus, a state is attempted to be produced where while a friction corresponding to an extent of the offset is being generated between the large diameter side end face of the primary inner ring 7a and the supporting surface 38 whenever the primary inner ring 7a rotates, the primary inner ring raceway 13a is pressed against the shoe 40 at all times (a radial positioning of the inner ring 7a when the primary inner ring 7a rotates can be accomplished in an ensured fashion).

Figure 3:
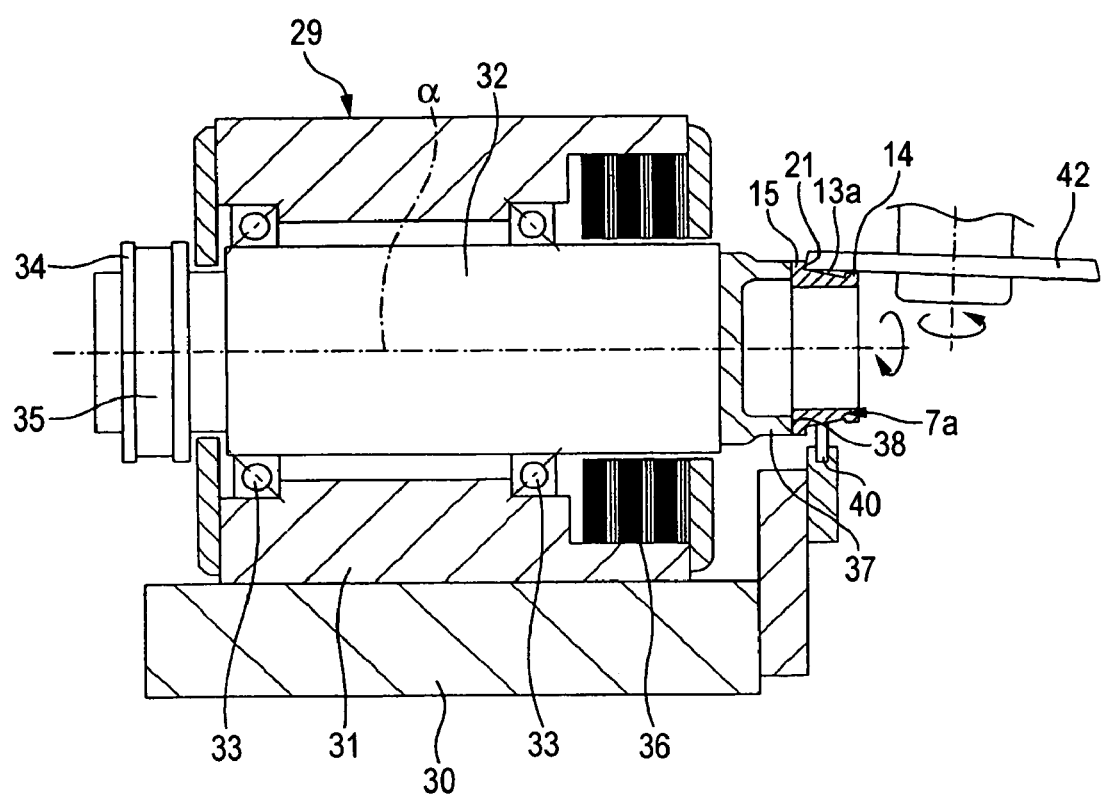
FIG. 3 is a sectional view showing a step of grinding to an inner surface of a large collar portion of Embodiment 1 of the invention.
Figure 4:
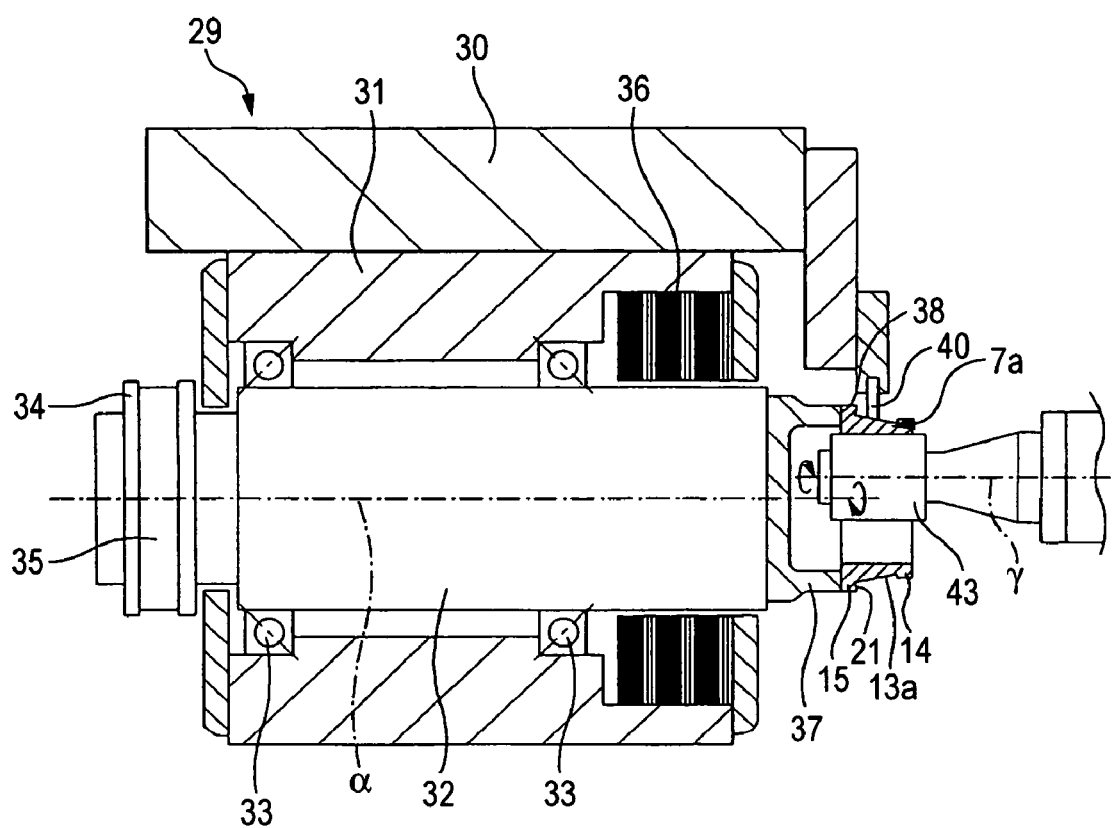
FIG. 4 is a sectional view showing a step of applying grinding to an inner circumferential surface of an inner ring of Embodiment 1.

In addition, in the case of this embodiment, an outer circumferential surface of the grinding wheel 41 which is rotating at high speed is brought into press abutment with a diametrically opposite portion of the primary inner ring raceway 13a to the shoe 40 in such a state that the inner ring 7a is made to rotate together with the spindle at high speed in the manner described above, whereby grinding finishing work is carried out on the primary inner ring raceway 13a. Following this, as shown in FIG. 3, while making the primary inner ring 7a rotate at high speed in the manner described above, an outer circumferential surface of another grinding wheel 42 which is rotating at high speed is brought into press abutment with a circumferential portion of an inner surface 21 of a large collar portion 15, whereby grinding finishing work is carried out on the inner surface 21. Following this, as shown in FIG. 4, while also making the primary inner ring 7a rotate at high speed in the manner described above, an outer circumferential surface (a cylindrical plane which rotates about an axis $\gamma$ which is parallel to the rotational center axis $\alpha$ of the spindle 32 as a center) of a further grinding wheel 43 which is rotating at high speed, whereby grinding finishing work is carried out on the inner circumferential surface of the primary inner ring 7a.

Note that the order of the grinding finishing work shown in FIGS. 1 to 4 may be changed as required. In addition, the same spindle headstock 29 and working facility may be used in the steps shown in FIGS. 1 to 4 or different spindle headstocks and working facilities may be used. In any case, in the case of this embodiment, by machining the supporting surface 38 in the way described above, the perpendicularity of the supporting surface 38 relative to the rotational center axis $\alpha$ of the spindle 32 is improved. Due to this, by carrying out the grinding finishing work n the way described above, the perpendicularity of the geometric center axis of the primary inner ring raceway 13a and the inner surface 21 of the large collar portion 15 and the inner circumferential surface of the primary inner ring 7a (the parallelism of these portions) relative to the large diameter side end face of the primary inner ring 7a can be improved. In addition, in the description that has been made heretofore, while the finishing work of the primary inner ring 7a has been described, finishing work is to be carried out on the secondary inner ring 7b according to the same procedure as that used for the primary inner ring 7a.

Figure 5:
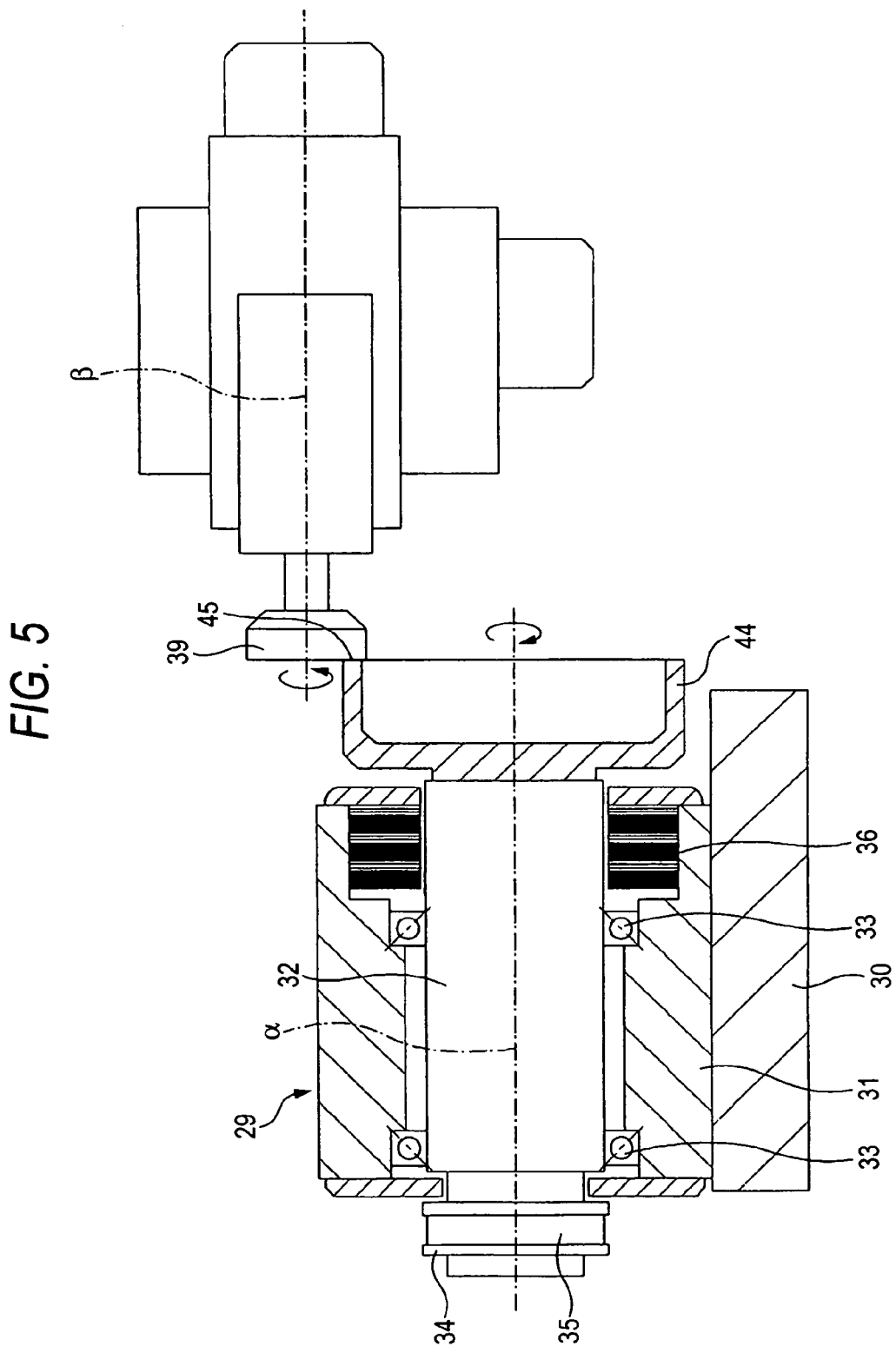
FIG. 5 is a sectional view showing a step of applying correction work to a supporting surface of a hub supporting member of Embodiment 1 of the invention.
Figure 6:
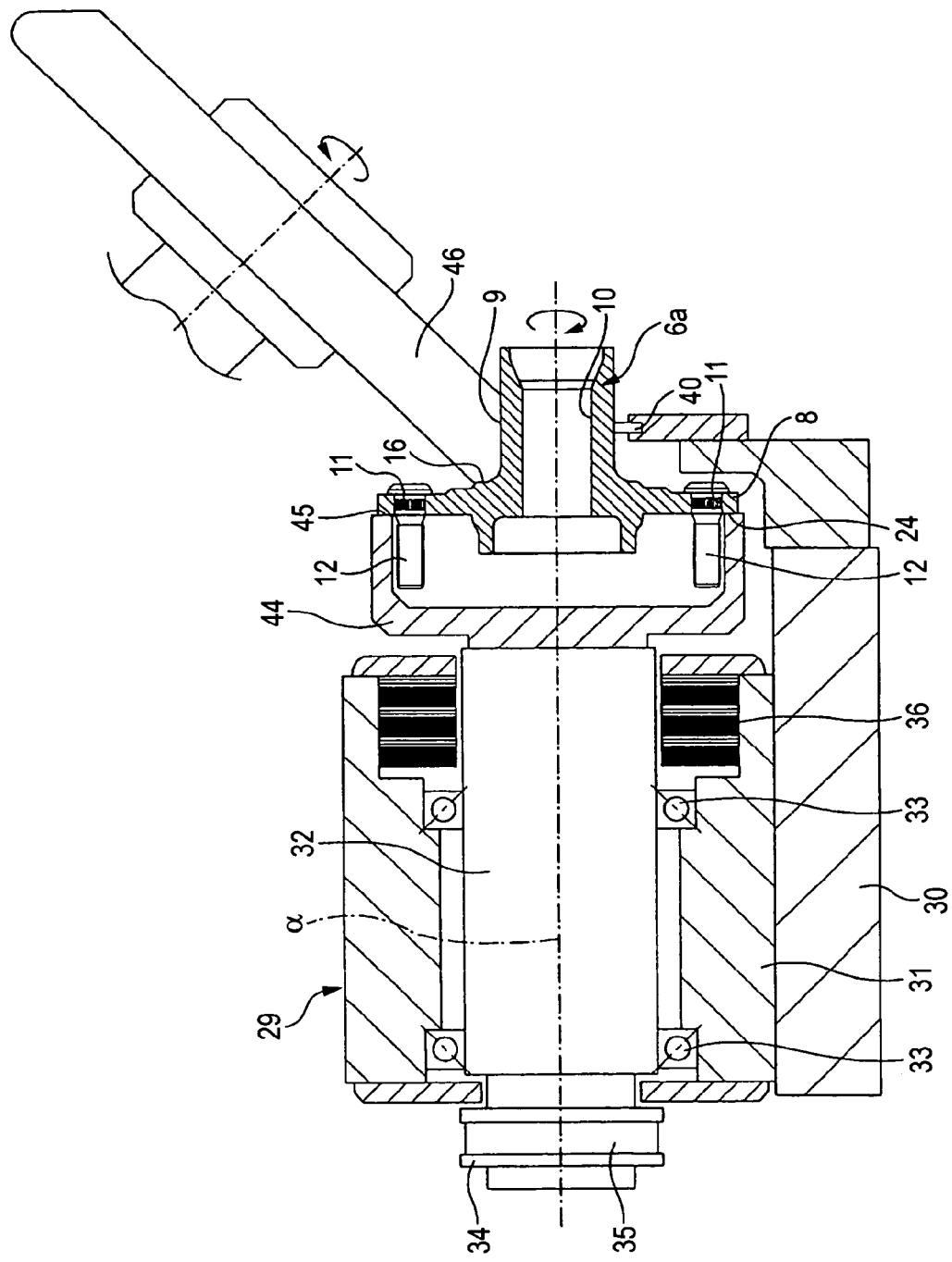
FIG. 6 is a sectional view showing a step of applying grinding to a cylindrical surface portion of a hub of Embodiment 1 of the invention.

Next, a process of applying finishing work to the hub main body 6a will be described by reference to FIGS. 5 to 6. In this embodiment, a spindle headstock 29 similar to that described above is also used to carry out this process. To be specific, firstly, as shown in FIG. 5, a steel, bottomed cylindrical hub supporting member 44 is mounted (fixedly coupled) on the distal end portion (a right end face in FIGS. 5 to 6) of the spindle 32 in such a manner as to be concentric with the spindle 32. Note that in this case, too, as with the aforesaid inner ring supporting member 37, the hub supporting member 44 is preferably fixed to the distal end portion of the spindle 32 by fastening a bolt or the like. In any case, in this state, a ring-like distal end face (the right end face in FIGS. 5 to 6) of the hub supporting member 44 is made to be a supporting surface 45 for supporting a large diameter side end face (a reference surface when carrying out finishing work) of each of the hub main body 6a. In order to finish the hub main body 6a to a desired shape and dimensions, the perpendicularity of the supporting surface 45 relative to the rotational center axis $\alpha$ of the spindle 32 needs to be improved. Due to this, in this embodiment, in such a state that the hub supporting member 44 is mounted on the distal end portion of the spindle 32 in the way described above, the shape and dimensions of the hub supporting member 44 are determined in design such that the perpendicularity of the supporting surface 45 relative to the rotational center axis $\alpha$ of the spindle 32 is improved. In reality, however, since there exist production errors and assembling errors, there may exist a possibility that the perpendicularity of the supporting surface 45 relative to the rotational center axis $\alpha$ of the spindle 32 is deteriorated in such a state that the hub supporting member 44 is mounted on the distal end portion of the spindle 32 as described above.

Then, in the case of this embodiment, after the hub supporting member 44 is mounted on the distal end portion of the spindle 32 in the way described above, in order to improve the perpendicularity of the supporting surface 45 relative to the rotational center axis $\alpha$ of the spindle 32, correction work is applied to the supporting surface 45. Due to this, specifically speaking, as shown in FIG. 5, while making the hub supporting member 44 rotate together with the spindle 32 at high speed, a distal end face (a plane normal to an axis $\beta$ which is parallel to the rotational center axis $\alpha$ of the spindle 32 which rotates about the axis $\beta$) of a grinding wheel 39 which rotates at high speed is brought into press abutment with a circumferential portion of the supporting surface 45. By doing this, grinding is applied to the supporting surface 45, so as to improve the perpendicularity of the supporting surface 45 relative to the rotational center axis $\alpha$ of the spindle 32. Note that when the inventor actually applied the grinding to the supporting surface 45 to thereby improve the perpendicularity of the supporting surface 45 relative to the rotational center axis $\alpha$ of the spindle 32, the rotational run-out (the displacement amount in a direction of the center axis $\alpha$ in association with rotation) of the supporting surface 45 could be suppressed to 1 μm or less easily. In addition, in the case of the embodiment, the correction work to the supporting surface 45 is also carried out immediately after the hub supporting member 45 is fixed to the distal end portion of the spindle 32 (when a set replacement is carried out). Thereafter, the correction work is performed as required in the event that the rotational run-out of the hub main body 6a (the axial displacement amount of a mounting surface 24 when this hub main body 6a is rotated on inner ring raceways 13a, 13b as a base) which is measured every time finishing work is applied to the hub main body 6a, which will be described below, or the rotational run-out of the supporting surface 45 exceeds a permissible value.

Figure 29:
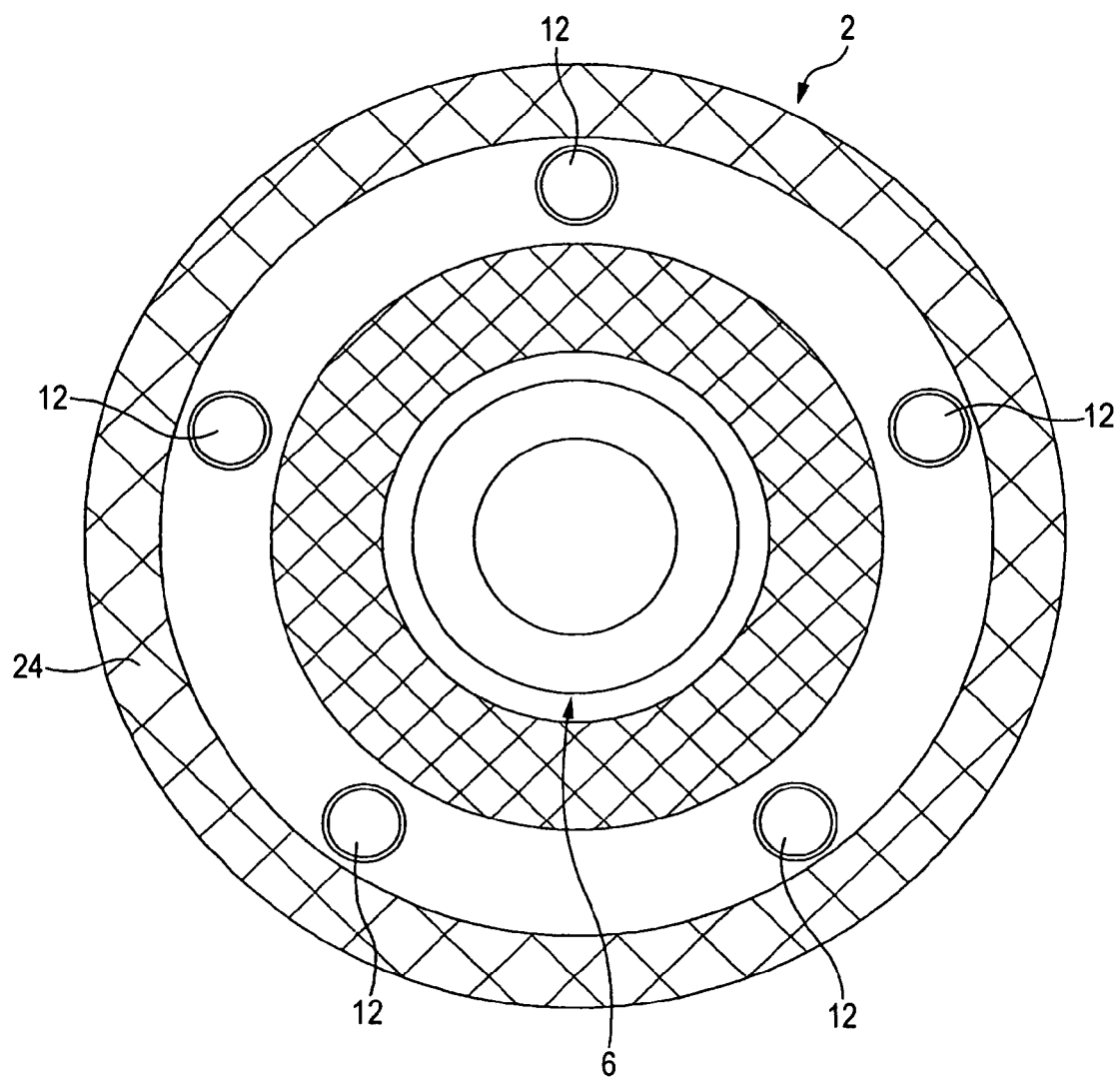
FIG. 29 is a view as seen from an axially outboard side of the hub.

In addition, studs 12, 12 are press fitted and fixed in place in a plurality of circular holes 11, 11, respectively, which are formed in the mounting flange 8 which constitutes the hub main body 6a. Thereafter, milling work is applied to part of an axially outboard surface of the mounting flange 8 which constitutes a mounting surface 24 (portions on the outboard surface shown as shaded with inclined lines in FIG. 29 which are offset radially inwards and outwards from a ring-like portion where the studs 12, 12 are arranged). This milling work is carried out using the method described in the aforesaid Japanese unexamined patent publication No. 1, whereby the plane accuracy of the mounting surface 24 is improved.

Then, where the correction work is applied to the supporting surface 45 and the plane surface of the mounting surface 24 is improved in the way described above, following this, finishing work is applied to the hub main body 6a. To describe specifically, as shown in FIG. 6, a radially outward end portion of the mounting surface 24 (a portion on the mounting surface 24 which lies radially further outwards than the studs 12, 12 and also radially further outwards than a cylindrical surface portion 9 which is formed on an outer circumferential surface of the hub main body 6a from an intermediate portion to an inboard end portion thereof and an stepped surface 16) is brought into the supporting surface 45 along the full circumference thereof, and a shoe 40 supported on a bed 30 is brought into sliding contact with a circumferential portion of the cylindrical surface portion 9. In association with this, the radially outward end portion of the mounting surface 24 is made to be attracted to be secured to the supporting surface 45 by means of an electromagnetic force excited by a magnet coil 36. Note that in the case of this embodiment, by causing the radially outward end portion of the mounting surface 24 to be attracted to be secured to the supporting surface 45 in this way, the supporting rigidity of the hub main body 6a by the hub supporting member 44 is secured sufficiently. Then, in this state, the hub main body 6a and the spindle 32 are rotated together at high speed. Note that in the case of this embodiment, in this state, the geometric center axis of the hub main body 6a is made to be offset on the order of 0.2 mm with respect to the rotational center axis α of the spindle 32. Thus, a state is attempted to be produced where while a friction corresponding to an extent of the offset is being generated between the mounting surface 24 and the supporting surface 45 whenever the hub main body 6a rotates, the cylindrical surface portion 9 is pressed against the shoe 40 at all times (a radial positioning of the hub main body 6a when the hub main body 6a rotates can be accomplished in an ensured fashion).

In addition, in the case of this embodiment, an outer circumferential surface of a grinding wheel 46 which is rotating at high speed is pressed against diametrically opposite portions of the cylindrical surface portion 9 and the stepped surface 16 to the shoe 40 in such a state that the hub main body 6a is made to rotate together with the spindle 32 at high speed in the way described above, whereby grinding finishing work is carried out on the cylindrical surface portion 19 and the stepped surface 16. In the case of this embodiment, the perpendicularity of the supporting surface 45 relative to the rotational center axis α of the spindle 32 is improved in the way described above. Due to this, by carrying out the grinding finishing work in the way described above, the perpendicularity of the geometric center axis of the cylindrical surface portion 9 and the stepped surface 16 (the parallelism of these portion) relative to the mounting surface 24 can be improved.

As has been described heretofore, according to the manufacturing method for manufacturing the wheel supporting bearing unit of the invention, the perpendicularity of the geometric center axis of the primary inner ring raceway 13a (the secondary inner ring raceway 13b) and the inner surface 21 of the large collar portion 15 and the inner circumferential surface of the primary inner ring 7a (the secondary inner ring 7b) relative to the large diameter side end face of the primary inner ring 7a (the parallelism of these portions) relative to the large diameter side end face of the primary inner ring 7a (the secondary inner ring 7b) can be improved. In association with this, the perpendicularity of the geometric center axis of the cylindrical surface portion 9 and the stepped surface 16 (the parallelism of these portions) relative to the mounting surface 24 provided on part of the axially outboard surface of the mounting flange 8 making up the hub main body 6a can be improved. As a result, the rotational run-out of the brake rotor that is mounted on the mounting surface 24 can be suppressed, thereby making it possible to suppress the occurrence of judder which would otherwise be the case when the brakes are applied.

Note that although it is natural, when carrying out Embodiment 1 that has been described heretofore, the correction work to the supporting surfaces 38, 45 may only have to be carried out in such a state that the inner ring supporting member 37 and the hub supporting member 44 are mounted on the end portion of the spindle 32, and whether or not the correction work is carried out in such a state that the spindle headstock 29 is installed on the grinding machine which applies the correction work to the individual supporting members 38, 45, the same advantage can be obtained.

Figure 7:
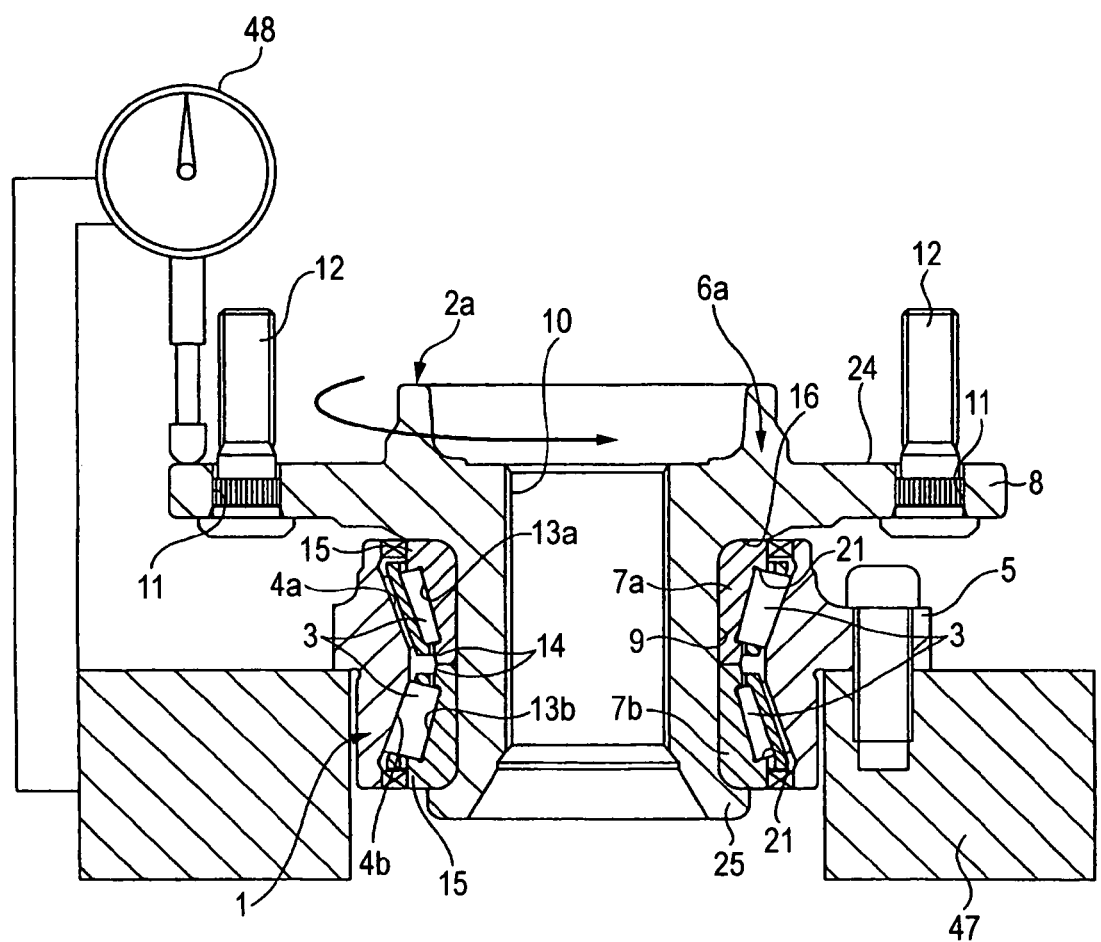
FIG. 7 is a sectional view showing a first example of measuring a rotational run-out of an axially outboard surface of a mounting flange.
Figure 8:
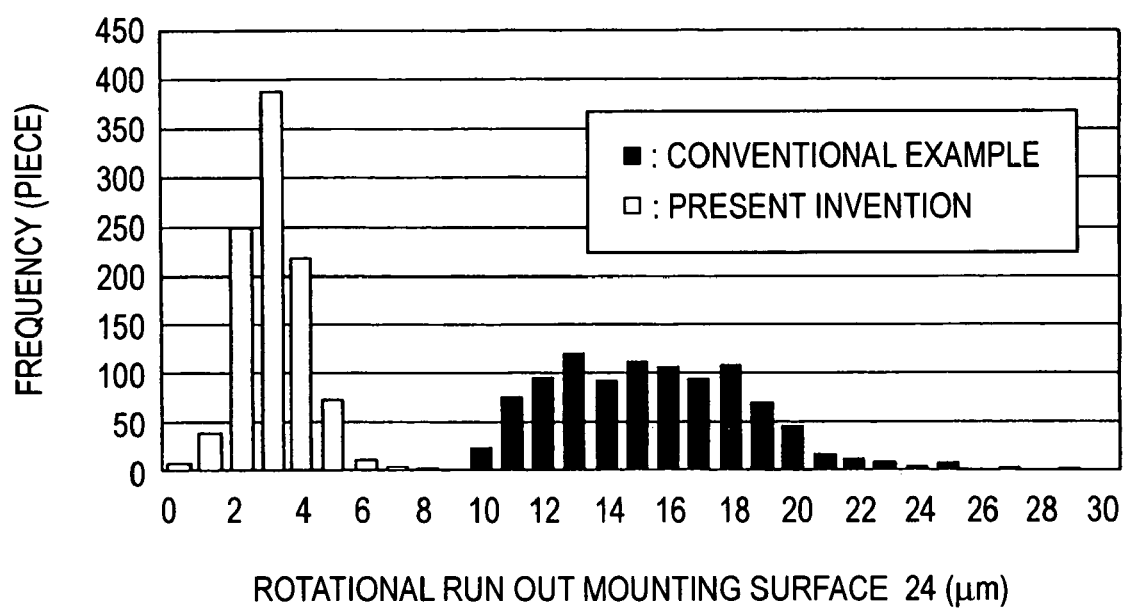
FIG. 8 is a graph showing the results of experiments carried out to verify advantages of the invention.
Figure 9:
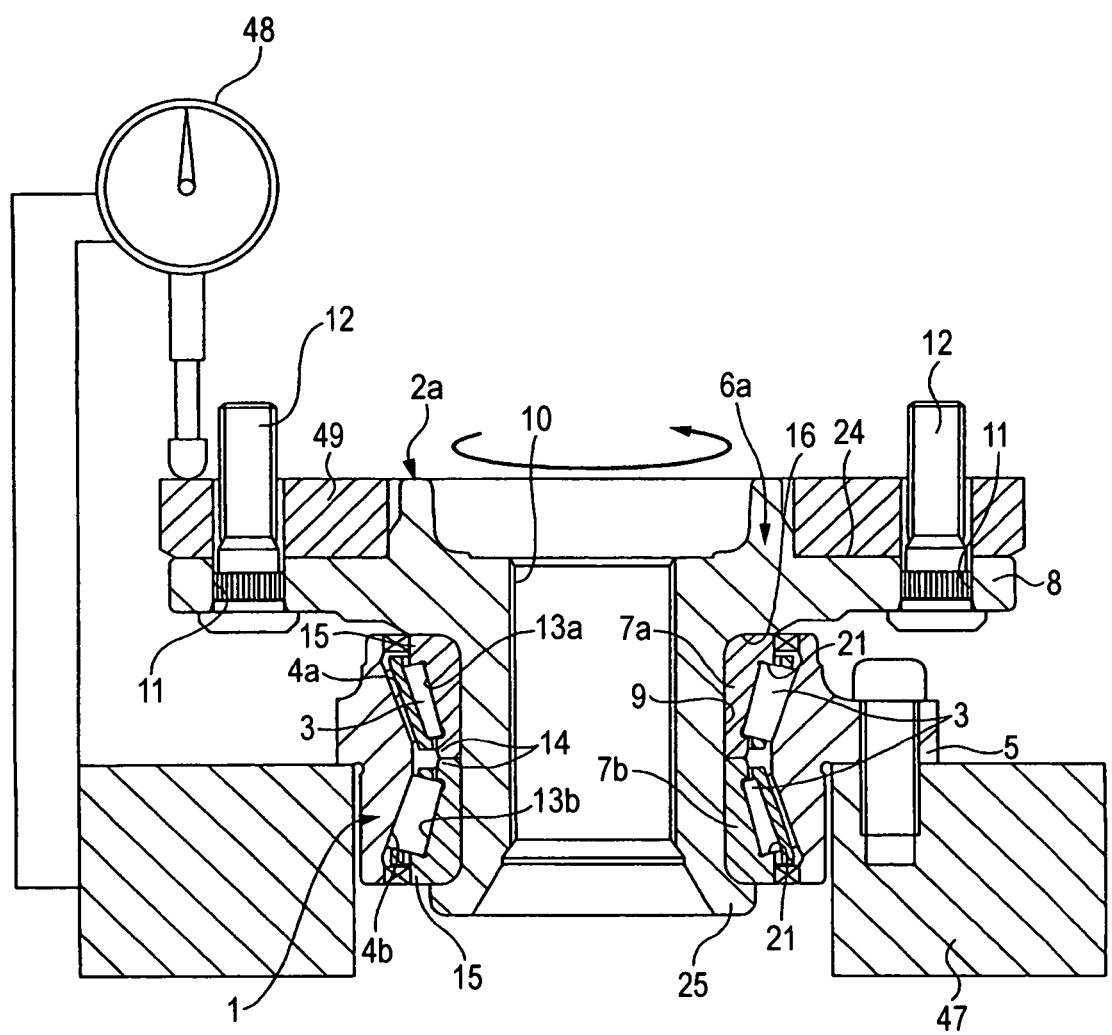
FIG. 9 is a sectional view showing a second example of measuring a rotational run-out of the axially outboard surface of the mounting flange.

Next, an experiment will be described which were carried out to verify the advantage of Embodiment 1. In the experiment, a plurality of wheel supporting bearing units were prepared to which the manufacturing method of Embodiment 1 (the manufacturing method in which the correction work is applied to the supporting surfaces 38, 45) was applied and a plurality of wheel supporting bearing units were prepared to which a conventional manufacturing method (a manufacturing method in which the correction work is not applied to the supporting surfaces 38, 45) was applied, and the rotational run-out of the mounting surface 24 was measured on each of the wheel supporting bearing units so prepared. Measuring work was performed as shown in FIG. 7. Namely, an outer ring 1 was supported on a supporting table 47, and a hub 2a was rotated relative to the outer ring 1 in such a state that a distal end portion of a measuring element of a dial gauge 48 supported on the supporting table 47. Then, a maximum deflection width of the dial gauge 48 resulting then was measured, and a measured value was taken as the rotational run-out of the mounting surface 24. The results of measurements are shown in FIG. 8. As is clear from the measuring results shown in FIG. 8, the rotational run-out of the mounting surface 24 can be suppressed better by the wheel supporting bearing units to which the manufacturing method of the embodiment was applied (the present invention) than the wheel supporting bearing units to which the conventional manufacturing method was applied (the conventional examples). In this experiment, the rotational run-out of the mounting surface 24 of the wheel supporting bearing units of the invention was about 10 μm or less. However, with the wheel supporting bearing units of the conventional examples, the results were obtained in which the rotational run-out of the mounting surface 24 was larger than 10 m. Note that while in FIG. 7, the distal end of the measuring element of the dial gauge 48 was brought into direct contact with the mounting surface 24, the rotational run-out of the mounting surface 24 can be measured even though the distal end of the measuring element of the dial gauge 48 is brought into contact with a side of a flat plate 49 superposed on the mounting surface 24, as shown in FIG. 9.

Embodiment 2

Figure 10:
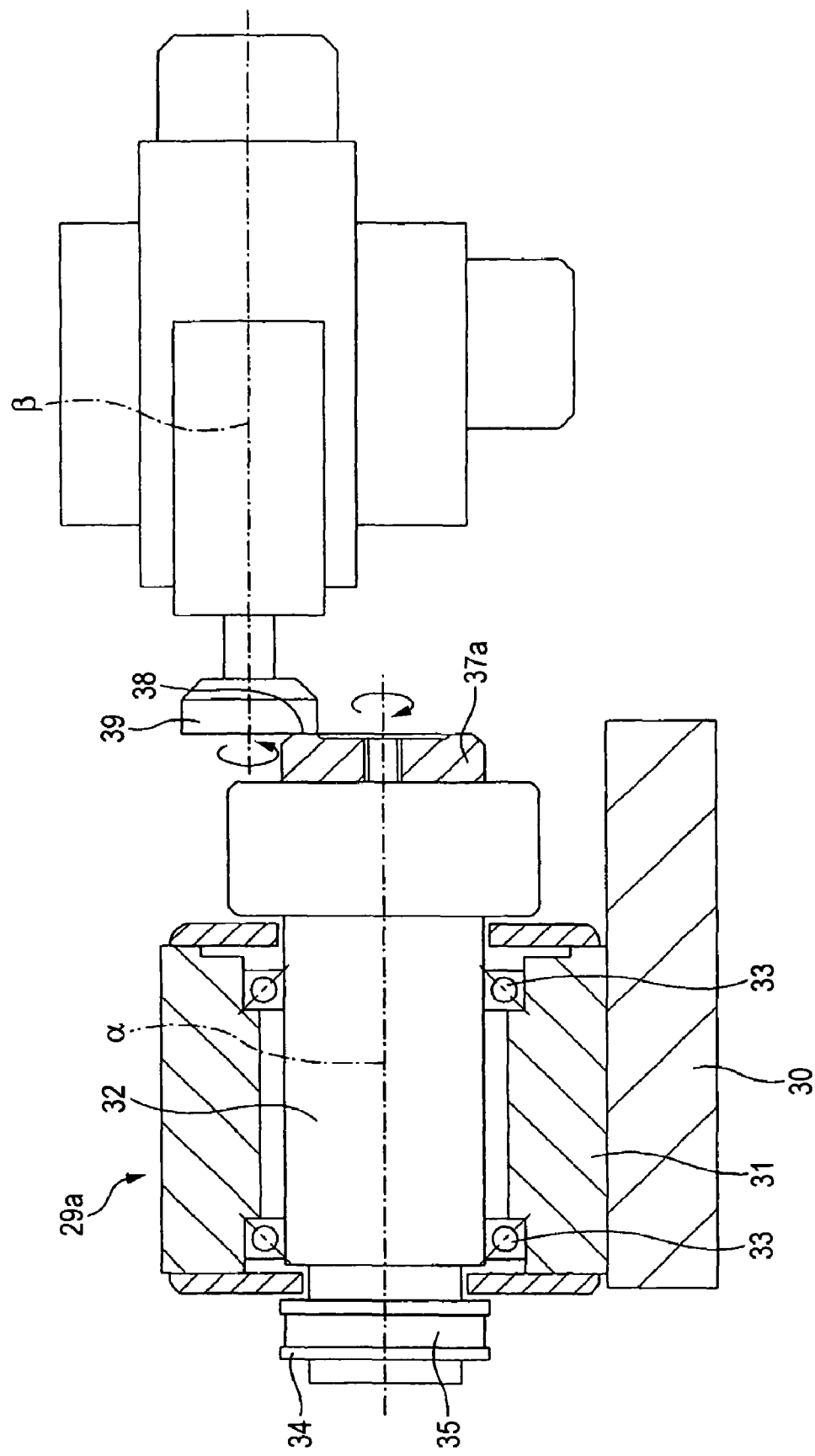
FIG. 10 is a sectional view showing a step of applying correction work to a supporting surface of an inner ring supporting member of Embodiment 2 of the invention.
Figure 11:
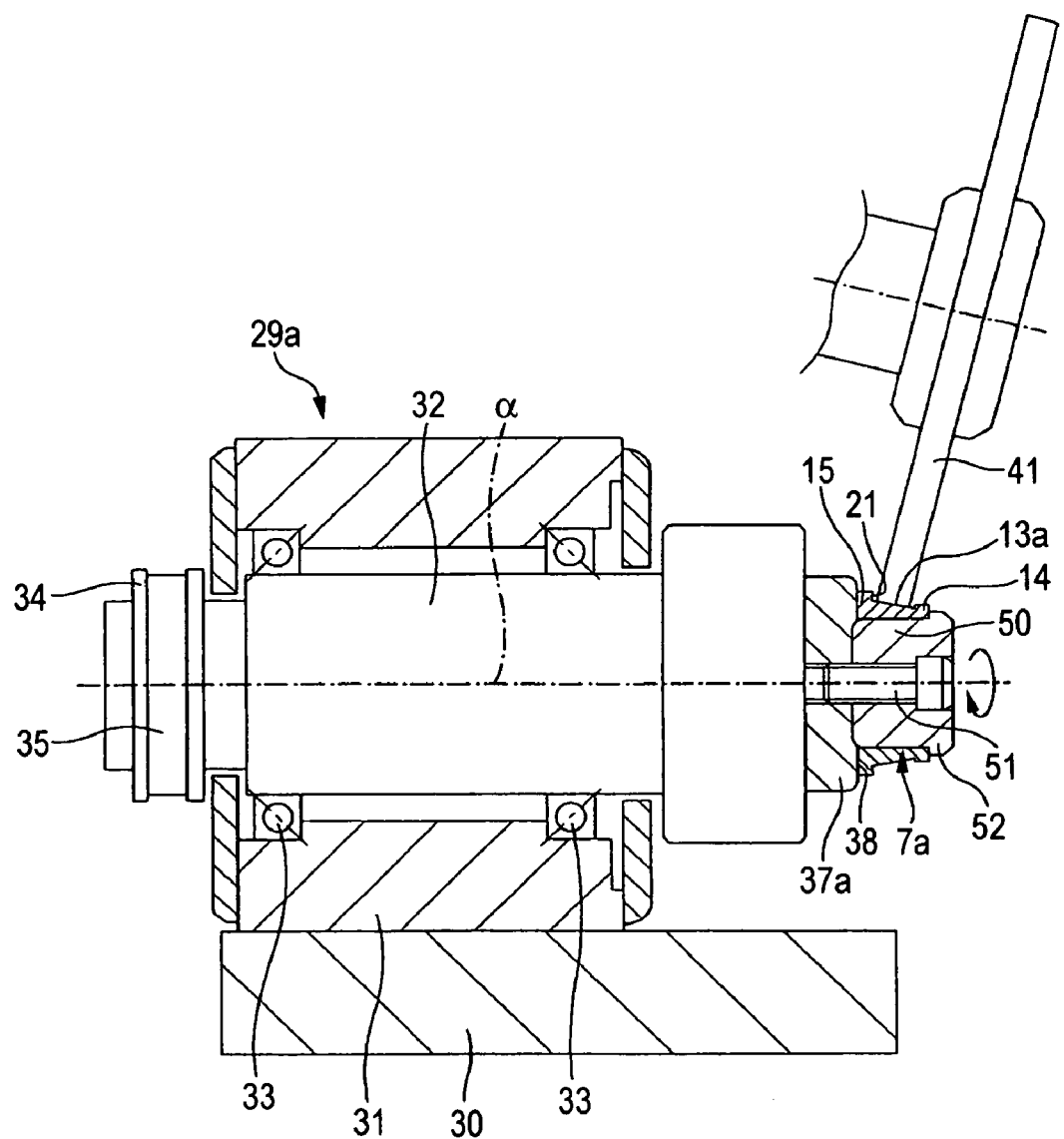
FIG. 11 is a sectional view showing a step of applying grinding to an inner ring raceway of Embodiment 2 of the invention.

Next, FIGS. 10 to 11 show Embodiment 2 of the invention. In the case of this embodiment, no magnet coil is provided on a spindle headstock 29 on which an inner ring supporting member 37a is mounted. In the case of this embodiment, when coupling a primary inner ring 7a to the inner ring supporting member 37a in order to apply finishing work to the inner ring 7a {true with a secondary inner ring 7b (FIG. 18)}, with a holding member 50 which is fitted in the primary inner ring 7a without any looseness coupled to the inner ring supporting member 37a with a screw 51 as shown in FIG. 11, the primary inner ring 7a is held in an axial direction between a supporting surface 38 of the inner ring supporting member 37a and an inner surface of a large collar portion 52 provided at an end portion of the holding member 50. In addition, in the case of this embodiment, since the radial positioning of the primary inner ring 7a is effected by the holding member 50, when applying finishing work to the primary inner ring 7a, a shoe is not brought into sliding contact with the primary inner ring 7a. Additionally, in the case of this embodiment, the geometric center axis of the primary inner ring 7a is made to coincide with a rotational center axis α of a spindle 32. Note that in the case of this embodiment, too, correction work is, of course, applied to the supporting surface 38 as shown in FIG. 10 before the primary inner ring 7a is coupled to the inner ring supporting member 37a. The other configurations and functions of this embodiment are similar to those of Embodiment 1.

Embodiment 3

Figure 12:
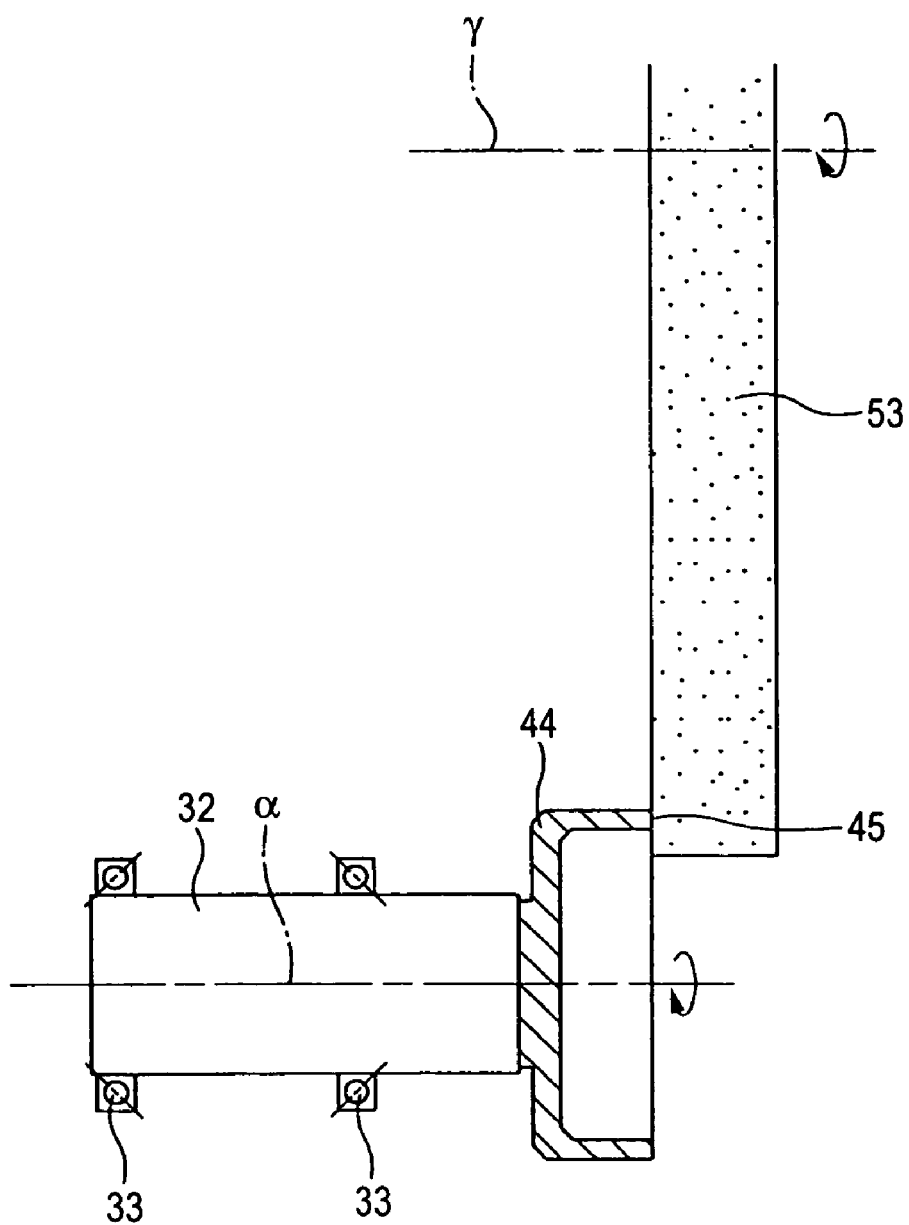
FIG. 12 is a sectional view showing a step of applying correction work to a supporting surface of a hub supporting member of Embodiment 2 of the invention.

Next, FIG. 12 shows Embodiment 3 of the invention. In Embodiment 1 that has been described above, the different grinding wheels were used for the correction work applied to the supporting surface 45 of the hub supporting member 44 fixed to the distal end portion of the spindle 32 and the finishing work applied to the hub main body 6a (refer to FIG. 6). In contrast to this, in the case of this embodiment, a grinding wheel 53 that is used for the finishing work is used when the correction work is applied. This grinding wheel 53 is such as to be used for finishing work for a cylindrical surface portion 9 of the hub main body 6a and is fixed to a grinding wheel shaft (not shown) whose center axis γ is parallel to a center axis α of a spindle 32 in such a manner as to be concentric with the grinding wheel shaft. In the grinding wheel 53 like this, when carrying out the finishing work, a cylindrical outer circumferential surface is used as a working surface, however, when carrying out the correction work, an axial side surface that is at right angles to the center axis γ is used as a working surface. Namely, in the case of this embodiment, when carrying out the correction work, as shown in the figure, while the hub supporting member 44 fixed to the distal end portion of the spindle 32 is made to rotate at high speed, a radially outward end portion of the axial side surface of the grinding wheel 53 which is rotating at high speed together with the grinding wheel shaft 53 is pressed against a circumferential portion of the supporting surface 45 of the hub support member 44, whereby grinding is applied to the supporting surface 44, so as to improve the perpendicularity of the supporting surface 45 relative to the center axis α of the spindle 32. Note that the grinding wheel 53 is mounted on a grinding machine with good accuracy from the viewpoint of securing sufficient safety and working accuracy. In addition, since the autogenous function due to the fall of abrasive grains acts on working surfaces (an outer circumferential surface and axial side surfaces) of the grinding wheel 53, there is no need to impart a special treatment to the working surfaces. In the case of this embodiment, however, a dresser (not shown), which is a repairing tool, is mounted on the grinding machine so as to repair the working surfaces.

As has been described above, in the case of this embodiment, the same grinding wheel 53 is used for applying the correction work to the supporting surface 45 and applying the finishing work to the cylindrical surface portion 9 of the hub main body 6a. Consequently, there is no need to prepare a grinding wheel for exclusive use for correction work (and a spindle unit on which the grinding wheel is mounted or the like), thereby making it possible to accomplish the reduction in working facility cost. In addition, since there is no need to change grinding wheels every time correction work is performed, an increase in efficiency of the production line can be accomplished. Namely, in the event that a spindle unit on which a correction work grinding wheel such as, for example, the grinding wheel 39 shown in FIG. 5 is mounted is set on the grinding machine, an operation to arrange a center axis β of the spindle unit in parallel with the center axis α of the spindle 32 with good accuracy becomes troublesome. In addition, normally, much time is taken to perform this operation. In contrast to this, in the case of this embodiment, since the changing operation like this does not have to be carried out, the increase in efficiency of the production line can be accomplished.

Note that in the case of a general outer surface grinding machine which is used to apply grinding (finishing work) to an outer circumferential surface (a surface to be worked) of the hub main body or the inner ring which makes up the aforesaid wheel supporting bearing unit, normally, a spindle which rotates at high speed together with a workpiece such as the hub main body or the inner ring and a grinding wheel shaft which rotates at high speed together with a disk-like grinding wheel are arranged in parallel with each other with good accuracy. In addition, this grinding wheel is fixed to the grinding wheel shaft in such a state that the grinding wheel shaft is passed through a circular hole provided at a central portion of the grinding wheel. Additionally, the outside diameter of the grinding wheel like this becomes 455 mm, 510 mm, 610 mm and the like and is large enough compared to the diameter dimension of the surface to be worked. In addition, the diameter dimension of the circular hole provided at the central portion of the grinding wheel is on the order of ½ the outside diameter of the grinding wheel. Additionally, the outside diameter of the grinding wheel gradually decreases due to the fall of abrasive grains from the outer circumferential surface of the grinding wheel and the outer circumferential surface being cut or ground away by the dresser which is the repairing tool. Then, this grinding wheel continues to be used until the outside diameter dimension becomes ¾ its initial dimension. Namely, in the case of a general outer surface grinding machine, in order to cope with the reduction in outside diameter of the grinding wheel or to cope with a change in outside diameter dimension of the surface of a workpiece which is a target to be worked, it is possible to move the grinding wheel diametrically. In addition, the diameter dimension of the supporting surface of the supporting member for supporting the hub main body or the inner ring is normally substantially equal to or larger than the diameter dimension of the surface to be worked. Furthermore, in the case of the general outer surface grinding machine, in order to cope with a change in grinding position of the surface of the workpiece which is a target to be worked with respect to the axial direction, it is possible to displace the spindle to which the workpiece is fixed in the axial direction. Consequently, in the case of this embodiment, in the event that a general outer surface grinding machine is used as the grinding machine which includes the grinding wheel 53, it is possible to press the axial side surface of the grinding wheel 53 against the supporting surface 45 of the hub supporting member 44 as shown in FIG. 12. In this case, in the event of a new grinding wheel 53, in particular, whose outside diameter is not decreased, a change in feeding amount of the outer surface grinding machine should be small which results when the axial side surface of the grinding wheel 53 is pressed against the supporting surface 45.

Embodiment 4

Figure 13:
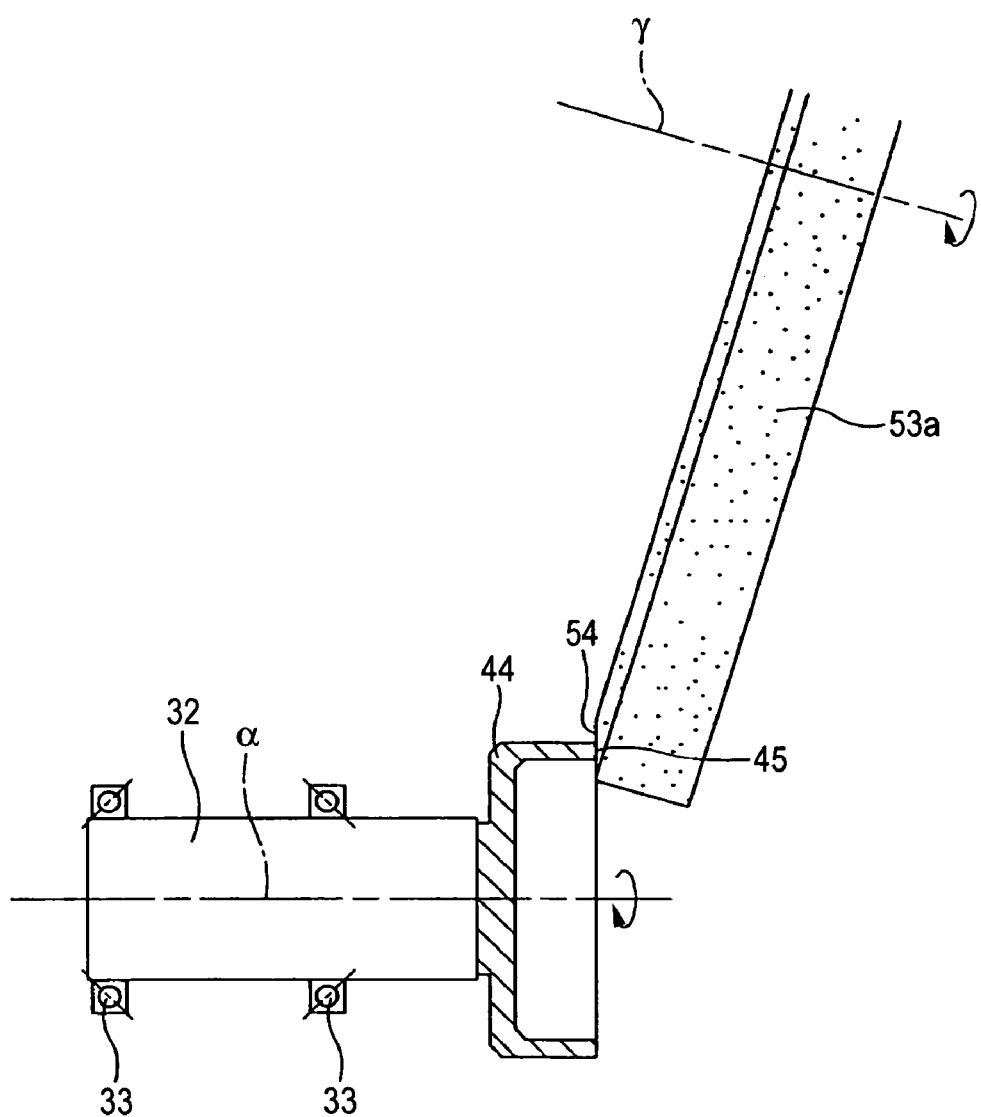
FIG. 13 is a similar view to FIG. 12, which shows Embodiment 4 of the invention.

Next, FIG. 13 shows Embodiment 4 of the invention. In the case of this embodiment, a grinding machine on which a grinding wheel 53a is mounted includes a mechanism for adjusting an angle made by a center axis γ of a grinding wheel shaft (not shown) to which the grinding wheel 53a is fixed and a center axis α of a spindle 32 to which a hub supporting member 44 is fixed. In addition, the grinding machine includes a dresser (not shown) which finishes a radially outward end portion of a side surface of the grinding wheel 53a into a taper surface 54 which is shaped into a coned raised surface. In the case of this embodiment that is configured as described above, when applying correction work to a supporting surface 45 of the hub supporting member 44, as shown in the figure, the angle made by the center axis γ and the center axis α is adjusted, and a circumferential portion of the taper surface 54 which rotates at high speed is pressed against a circumferential portion of the supporting surface 45 which rotates at high speed at right angles to the center axis α. The other configurations and functions of this embodiment are similar to those of the embodiments that have been described heretofore.

Embodiment 5

Figure 14:
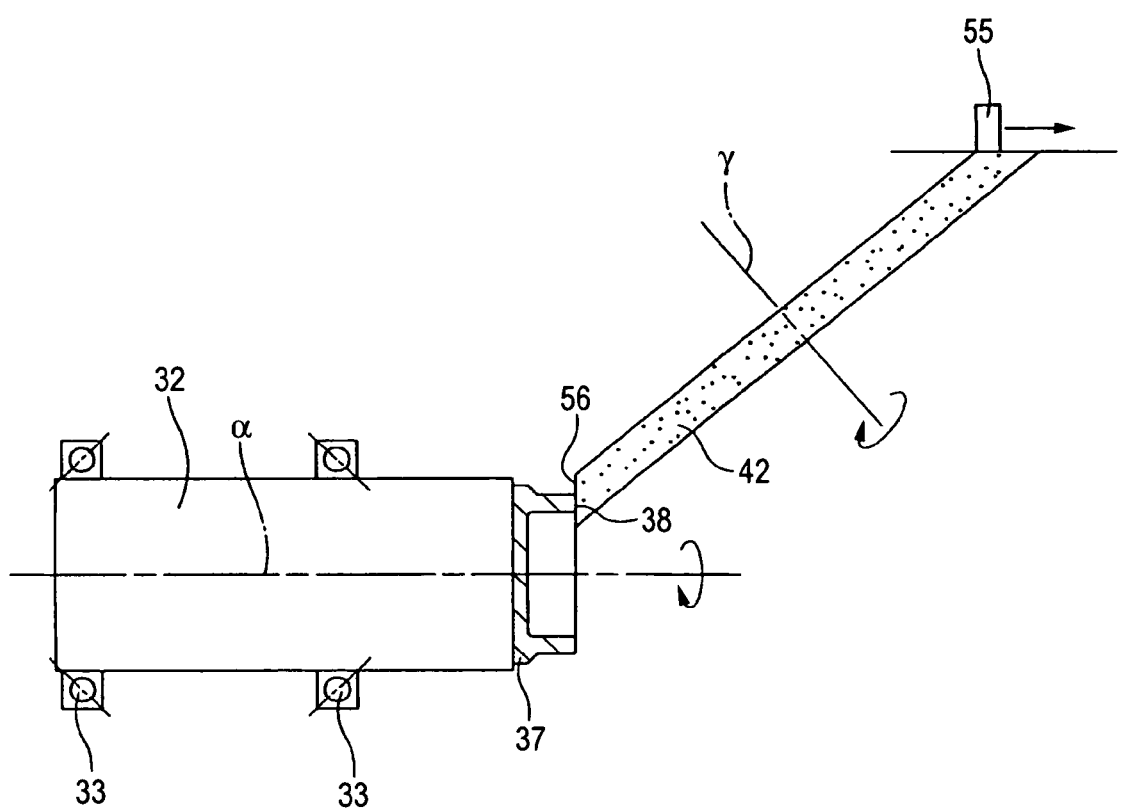
FIG. 14 is a sectional view showing a step of applying correction work to a supporting surface of an inner ring supporting member of Embodiment 5 of the invention.

Next, FIG. 14 shows Embodiment 5 of the invention. In the case of this embodiment, when applying correction work to a supporting surface 38 of an inner ring supporting member 37 which is fixed to a distal end portion of a spindle 32, a grinding wheel 42 is used which is used to apply finishing work to an inner surface 21 (refer to FIG. 3) of a large collar portion 15 which makes up a primary inner ring 7a. Namely, when applying correction work to the supporting surface 38, as shown in the figure, an angle made by a center axis α of the spindle 32 and a center axis γ of a grinding wheel shaft (not shown) is adjusted, and a circumferential portion of an outer circumferential surface (a taper surface 56 shaped into a coned raised surface) of the grinding wheel 42 which rotates at high speed is pressed against a circumferential portion of the supporting surface 38 which rotates at high speed at right angles to the center axis α. Note that a grinding machine on which the grinding wheel 42 is mounted includes a dresser 55 which finishes the outer circumferential surface of the grinding wheel 42 into the taper surface 56. The other configurations and functions of this embodiment are similar to those of the embodiments that have been described heretofore.

Embodiment 6

Figure 15:
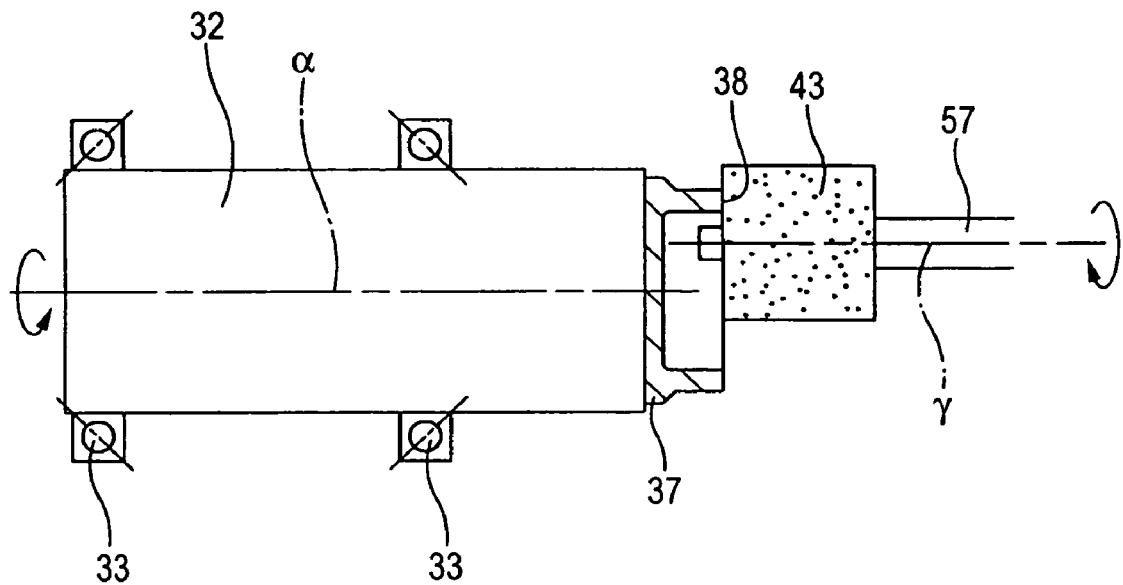
FIG. 15 is a similar view to FIG. 14, which shows Embodiment 16 of the invention.

Next, FIG. 15 shows Embodiment 6 of the invention. In the case of this embodiment, when applying correction work to a supporting surface 38 of an inner ring supporting member 37 which is fixed to a distal end portion of a spindle 32, a grinding wheel 43 is used which is used to apply finishing work to an inner circumferential surface of a primary inner ring 7a (refer to FIG. 4). Namely, when applying correction work to the supporting surface 38, as shown in the figure, with a center axis α of the spindle 32 and a center axis γ of a grinding wheel shaft 57 held in parallel with each other, a circumferential portion of a distal end face (a ring-shaped plane at right angles to the center axis γ) of the grinding wheel 42 which rotates at high speed is pressed against a circumferential portion of the supporting surface 38 which rotates at high speed. Note that although omitted, in the case of this embodiment, too, a dresser for repairing a distal end face of the grinding wheel 42 which constitutes a working surface is preferably mounted on a grinding machine. The other configurations and functions of this embodiment are similar to those of the embodiments that have been described heretofore.

In addition, in the event the correction work is carried out with a different grinding wheel from the aforesaid grinding wheel 42, a spindle unit on which this different grinding wheel is mounted is set at a position which faces the distal end portion of the spindle 32. In the case of the inner surface grinding machine for applying the grinding (finishing work) to the inner circumferential surface (the surface to be worked) of the primary inner ring 7a which is used in Embodiment 6 that has just been described, a grinding wheel headstock which supports the grinding wheel 42 is set at a position which faces axially the distal end portion of the spindle 32. Due to this, there may occur a case where the spindle unit is difficult to be set at the position which faces the distal end portion of the spindle 32. In contrast to this, in the event of Embodiment 6 that has been described above, an advantage can also be obtained that the inconvenience like this can be eliminated.

Embodiment 7

Figure 16:
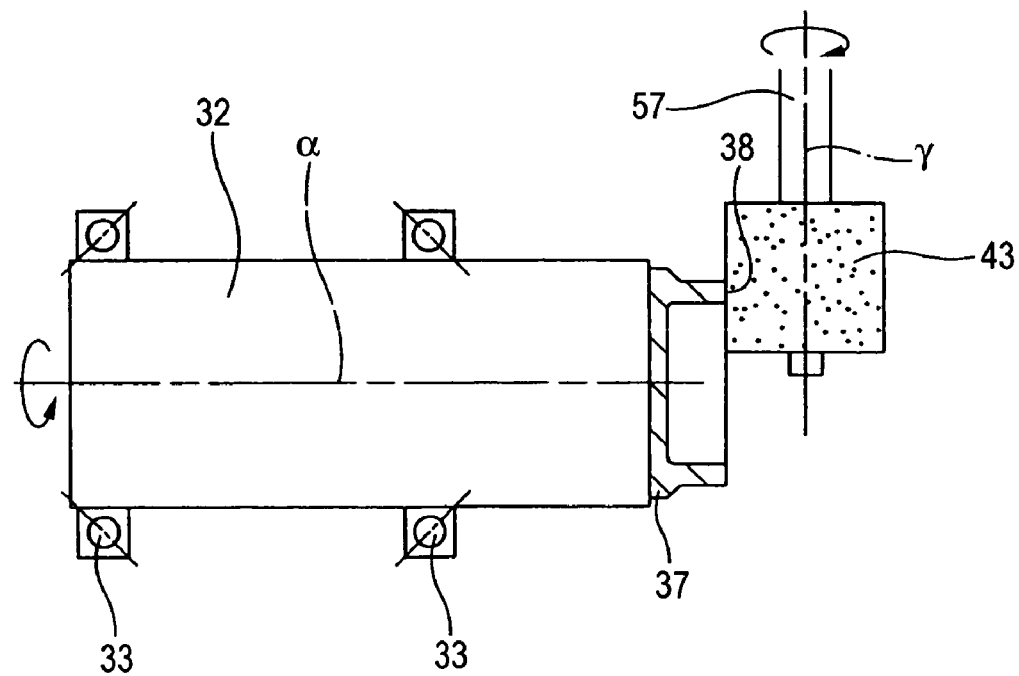
FIG. 16 is a similar view to FIG. 14, which shows Embodiment 17 of the invention.
Figure 17:
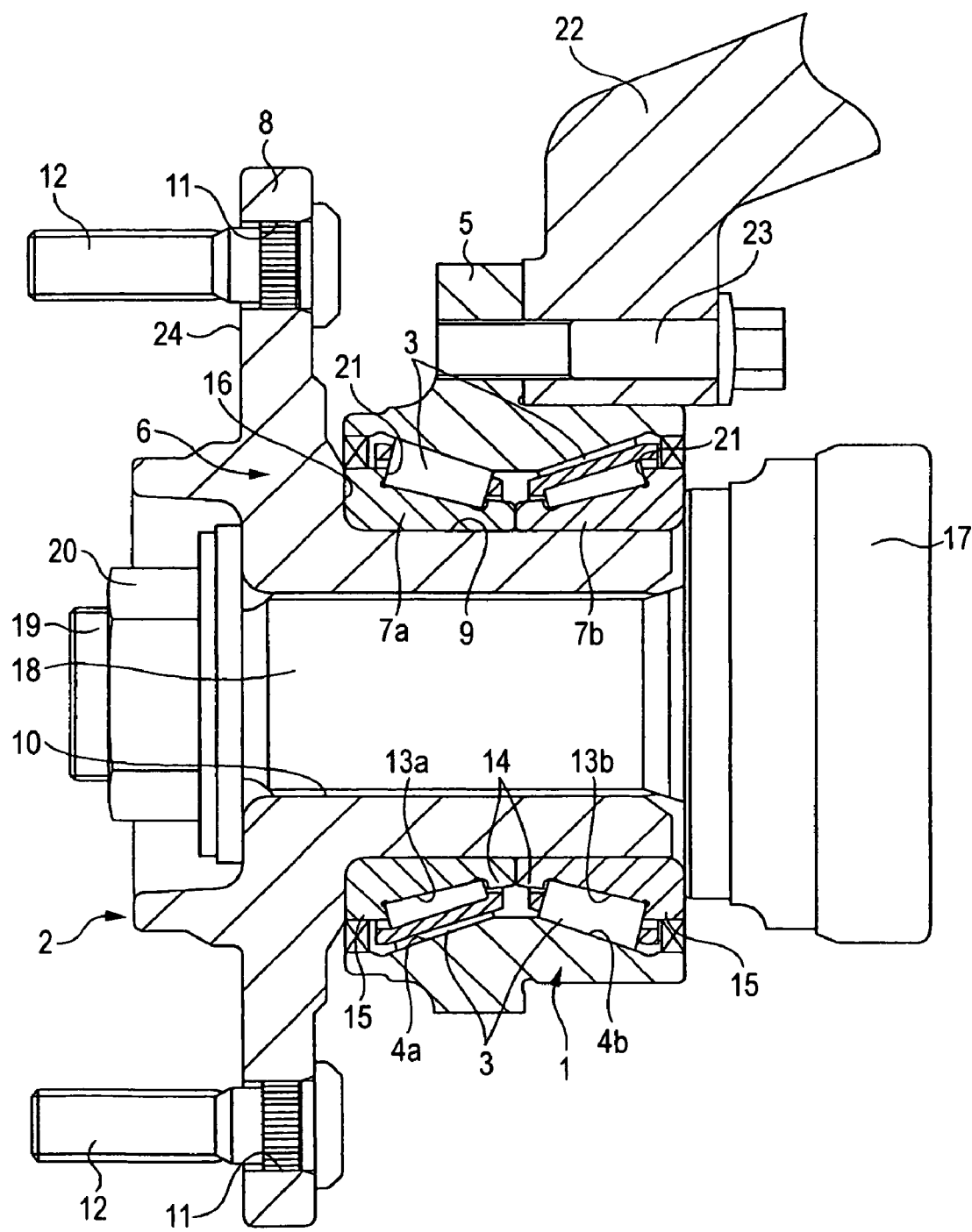
FIG. 17 is a sectional view showing a state in which a first example of a conventionally known wheel supporting bearing unit is assembled to a vehicle.

Next, FIG. 16 shows Embodiment 7 of the invention. In the case of this embodiment, too, as with Embodiment 6 that has been described above, a grinding wheel 43 that is used to apply finishing work to an inner circumferential surface of a primary inner ring 7a (refer to FIG. 4) is used when applying correction work to a supporting surface 38 of an inner ring supporting member 37 fixed to a distal end portion of a spindle 32. However, in contrast to Embodiment 6 where the distal end face of the grinding wheel 43 is used as the working surface for the supporting surface 38, in the case of this embodiment, an outer circumferential surface of the grinding wheel 43 is used as the working surface for the supporting surface 38. Namely, when applying correction work to this supporting surface 38, as shown in the figure, an angle made by a center axis α of the spindle 32 and a center axis γ of a grinding wheel shaft 57 is adjusted to 90 degrees, and the outer circumferential surface of the grinding wheel 42 which rotates at high speed is pressed against a circumferential portion of the supporting surface 38 which rotates at high speed at right angles to the center axis α. The other configurations and functions of this embodiment are similar to those of the embodiments that have been described heretofore.

Figure 18:
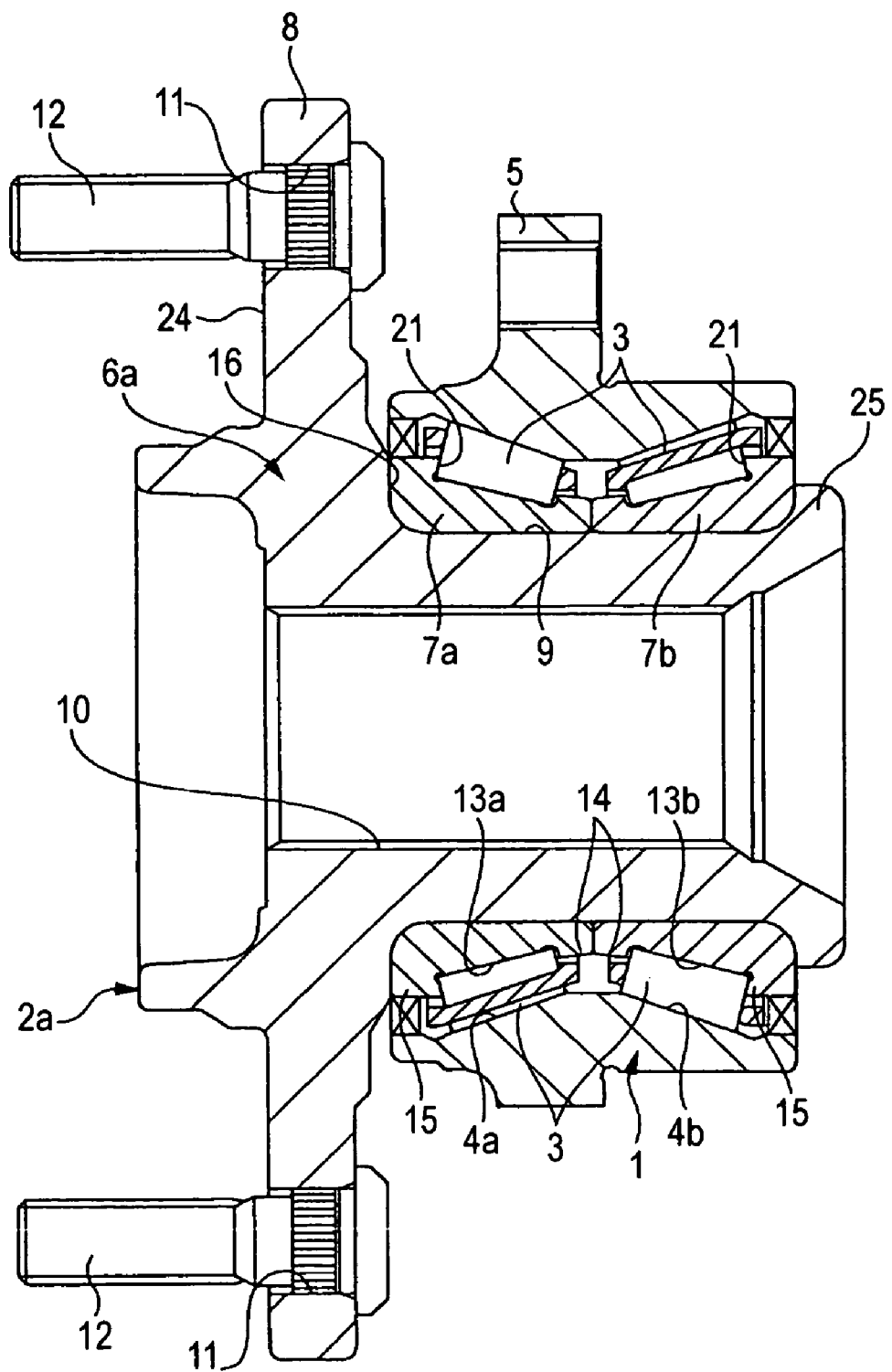
FIG. 18 is a sectional view showing a state in which a second example of a conventionally known wheel supporting bearing unit is assembled to the vehicle.
Figure 19:
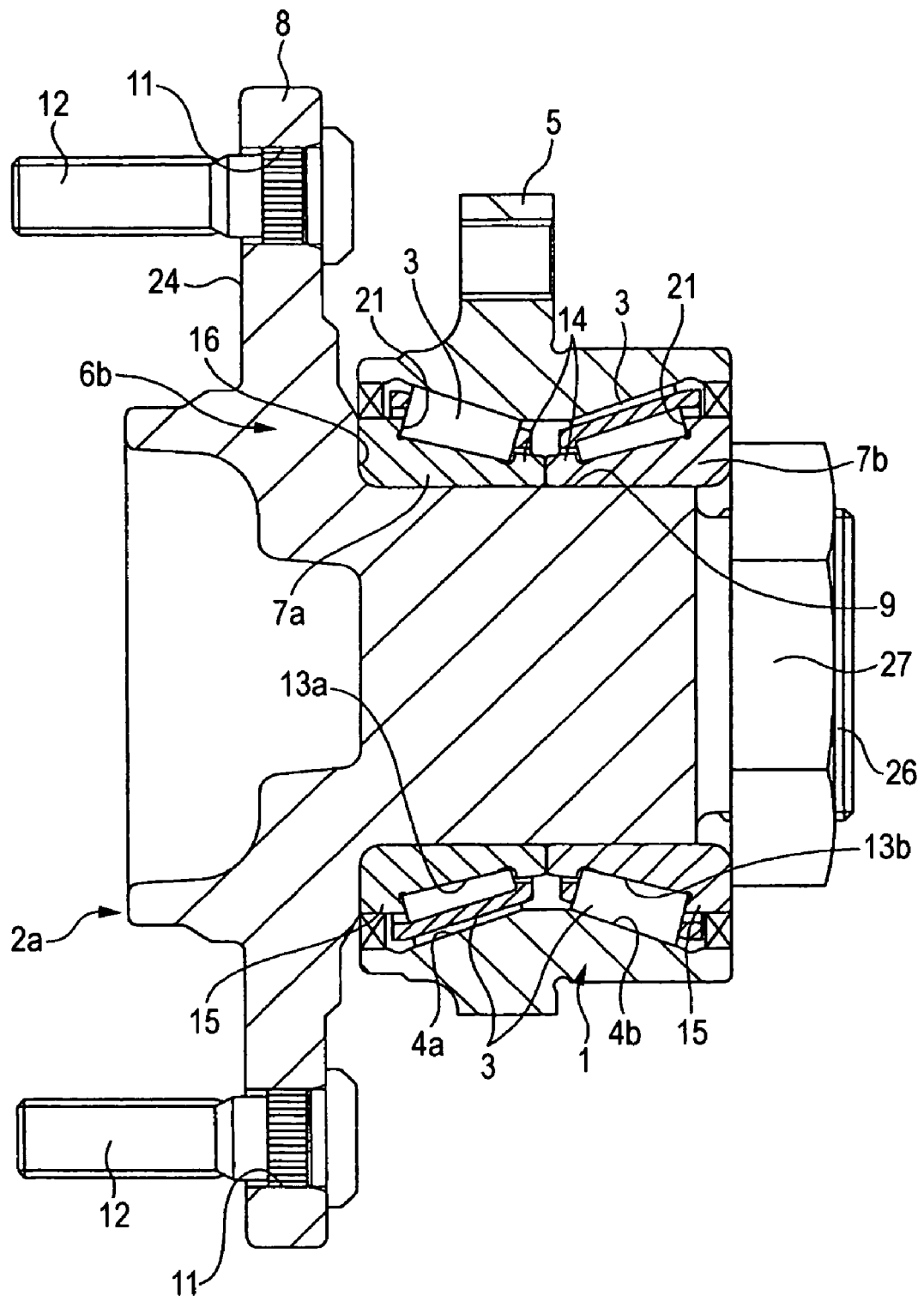
FIG. 19 is a sectional view showing a state in which a third example of a conventionally known wheel supporting bearing unit is assembled to the vehicle.
Figure 20:
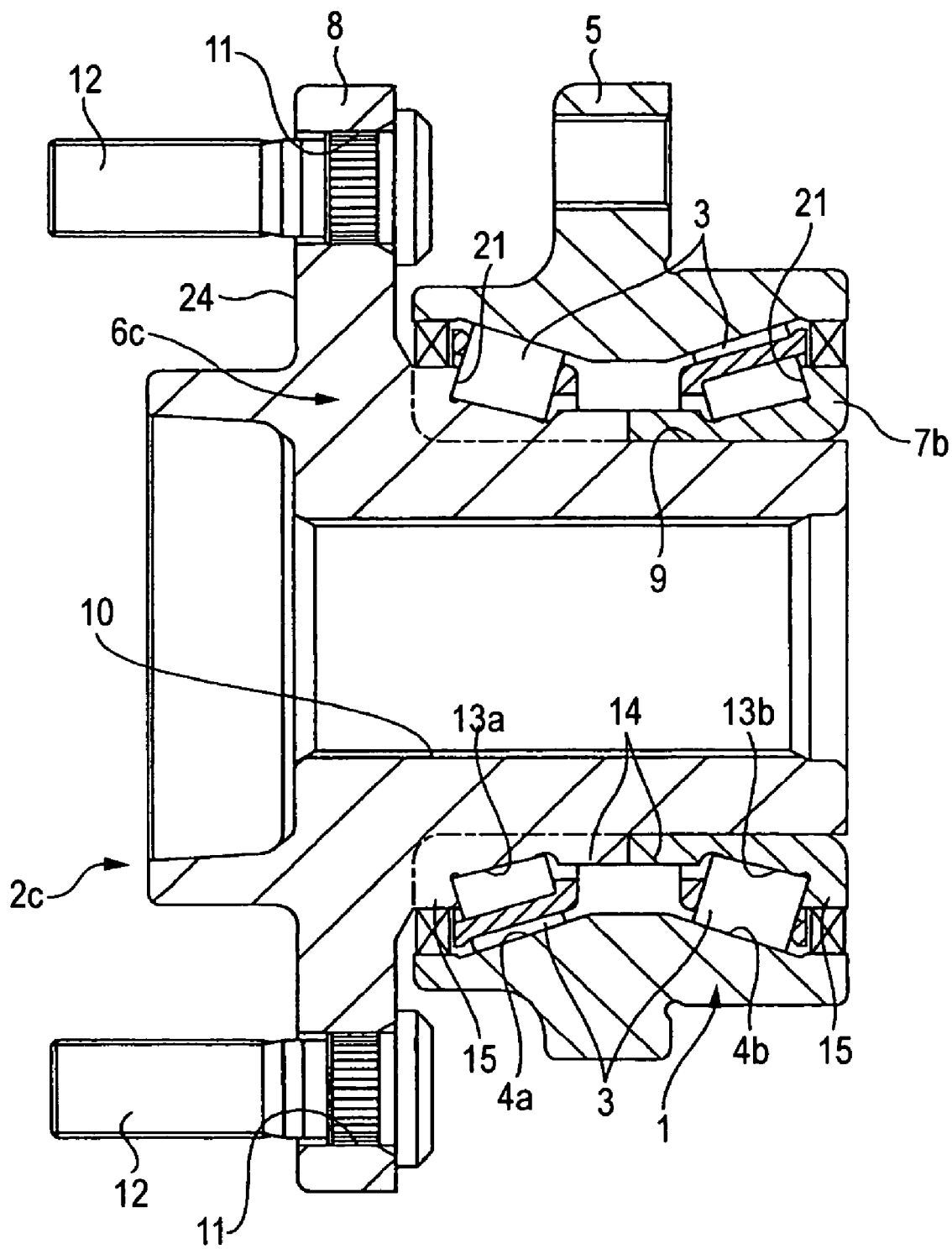
FIG. 20 is a sectional view showing a state in which a fourth example of a conventionally known wheel supporting bearing unit is assembled to the vehicle.
Figure 21:
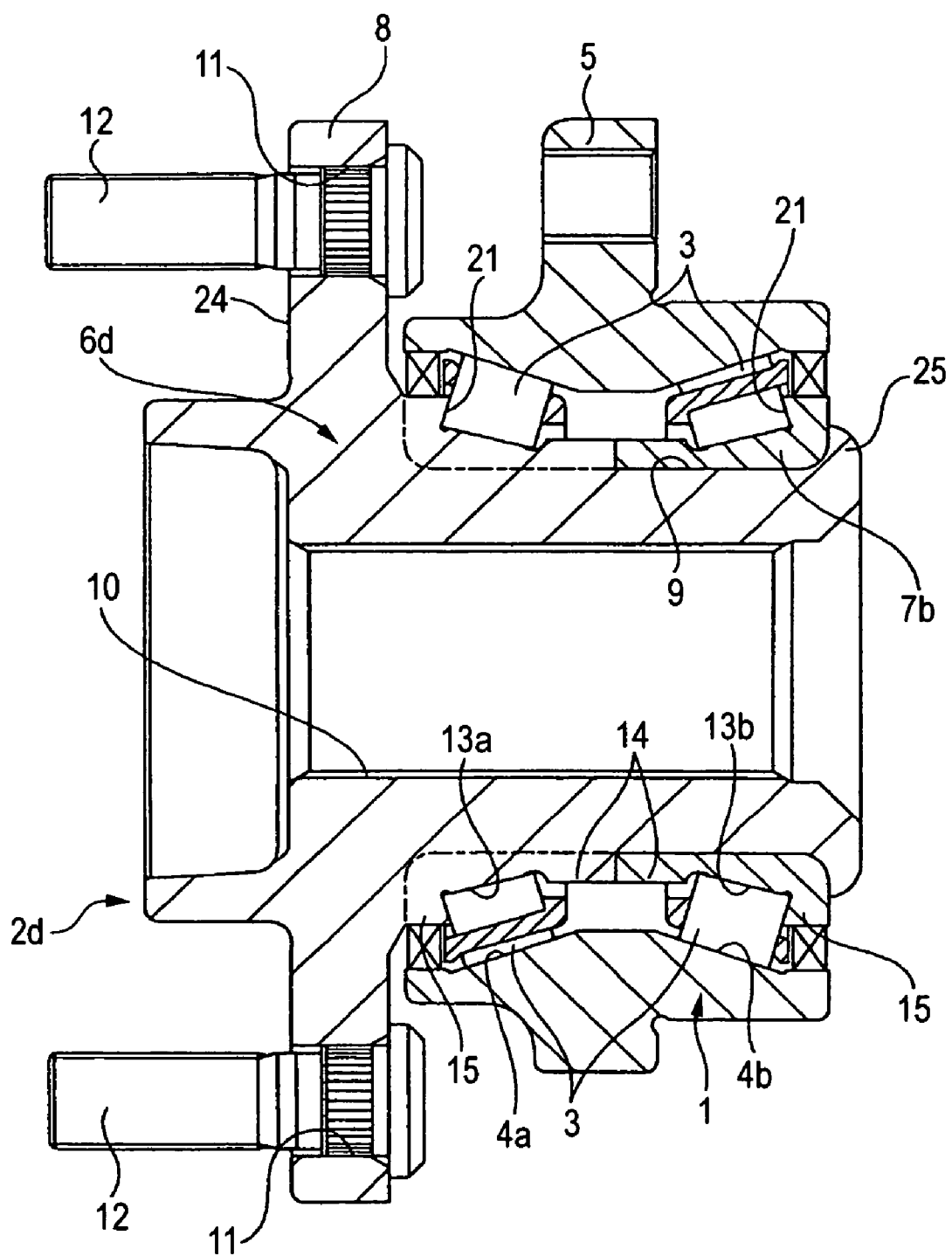
FIG. 21 is a sectional view showing a state in which a fifth example of a conventionally known wheel supporting bearing unit is assembled to the vehicle.
Figure 22:
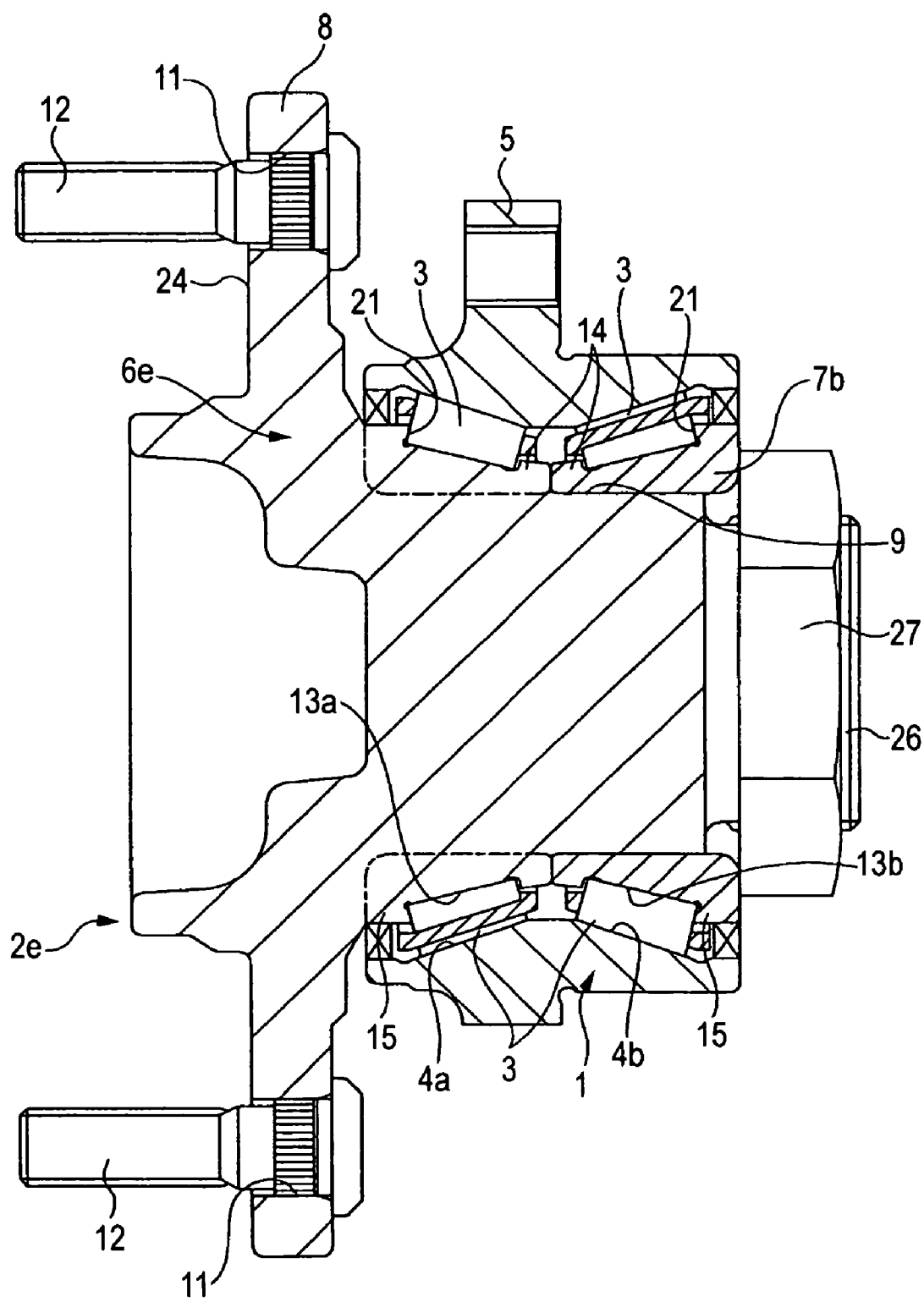
FIG. 22 is a sectional view showing a state in which a sixth example of a conventionally known wheel supporting bearing unit is assembled to the vehicle.
Figure 23:
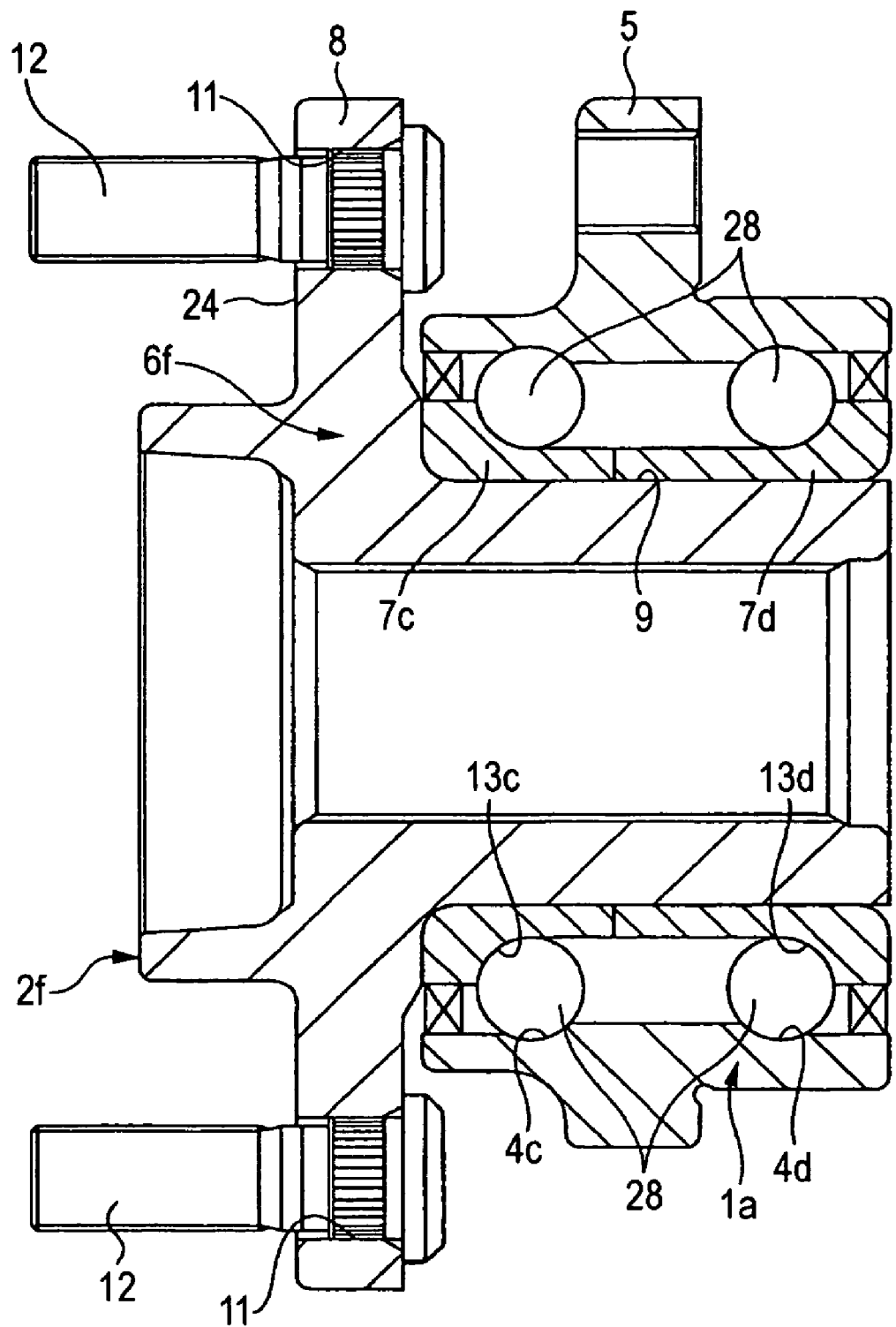
FIG. 23 is a sectional view showing a state in which a seventh example of a conventionally known wheel supporting bearing unit is assembled to the vehicle.
Figure 24:
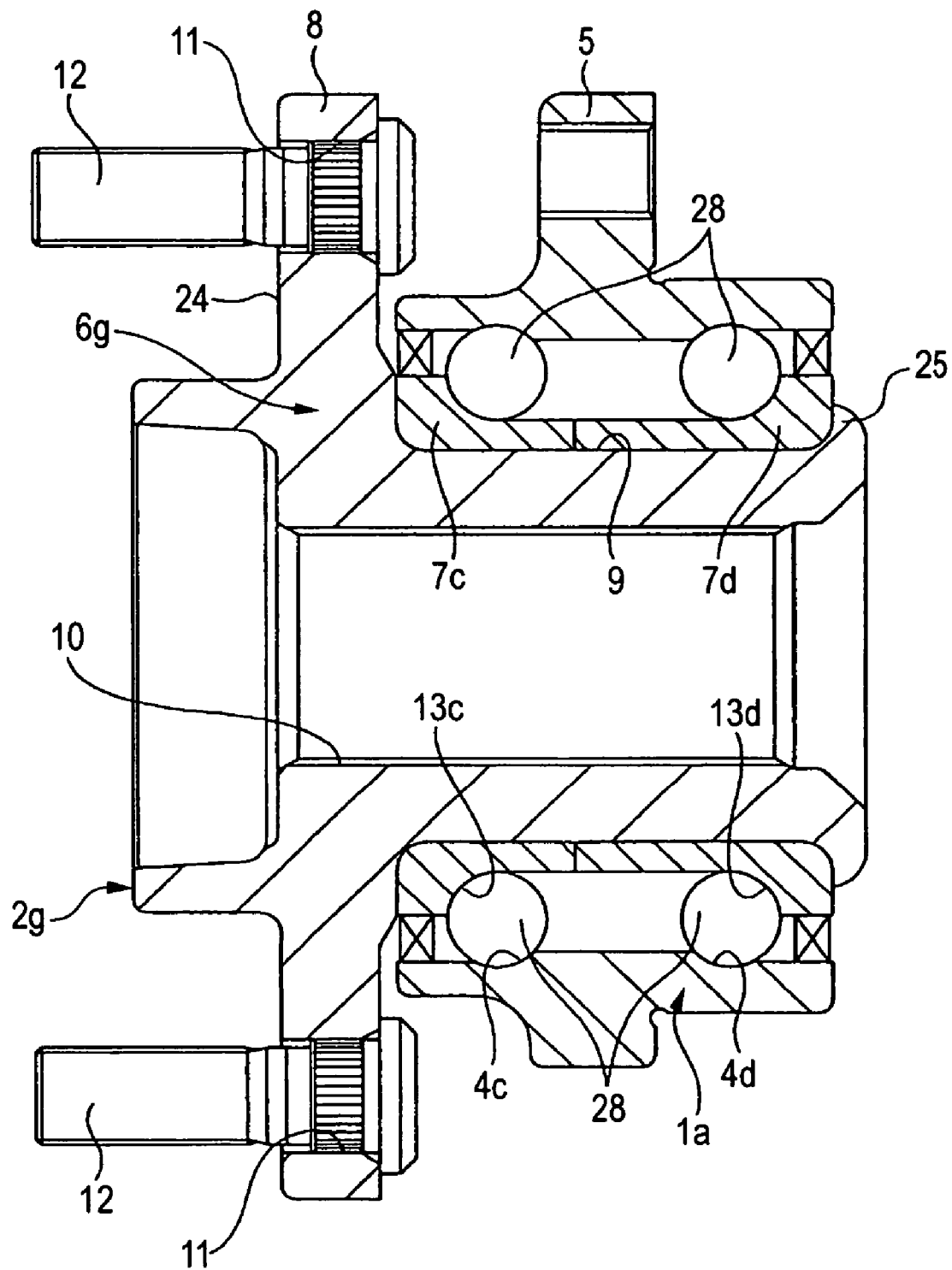
FIG. 24 is a sectional view showing a state in which a eighth example of a conventionally known wheel supporting bearing unit is assembled to the vehicle.
Figure 25:
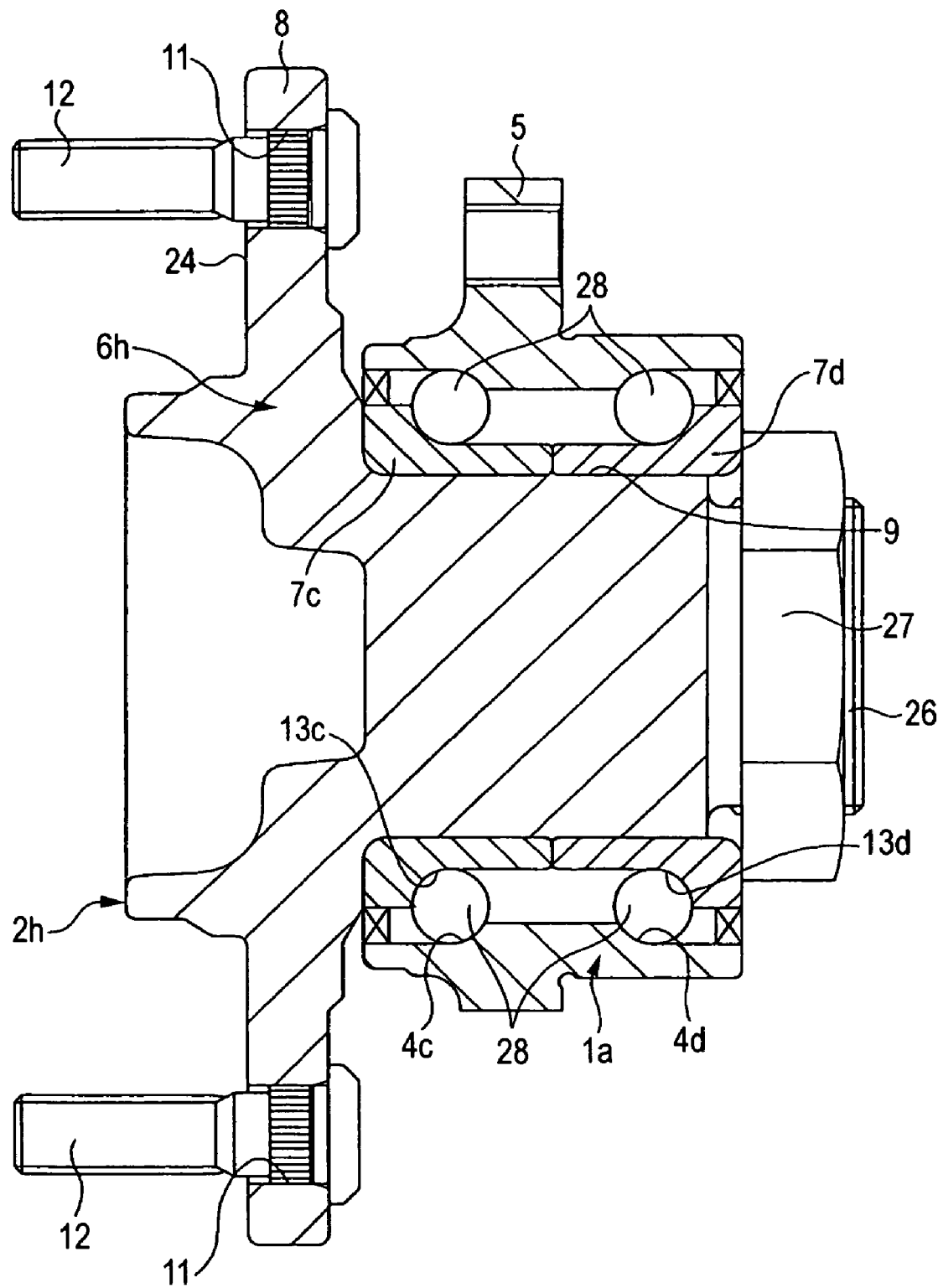
FIG. 25 is a sectional view showing a state in which a ninth example of a conventionally known wheel supporting bearing unit is assembled to the vehicle.
Figure 26:
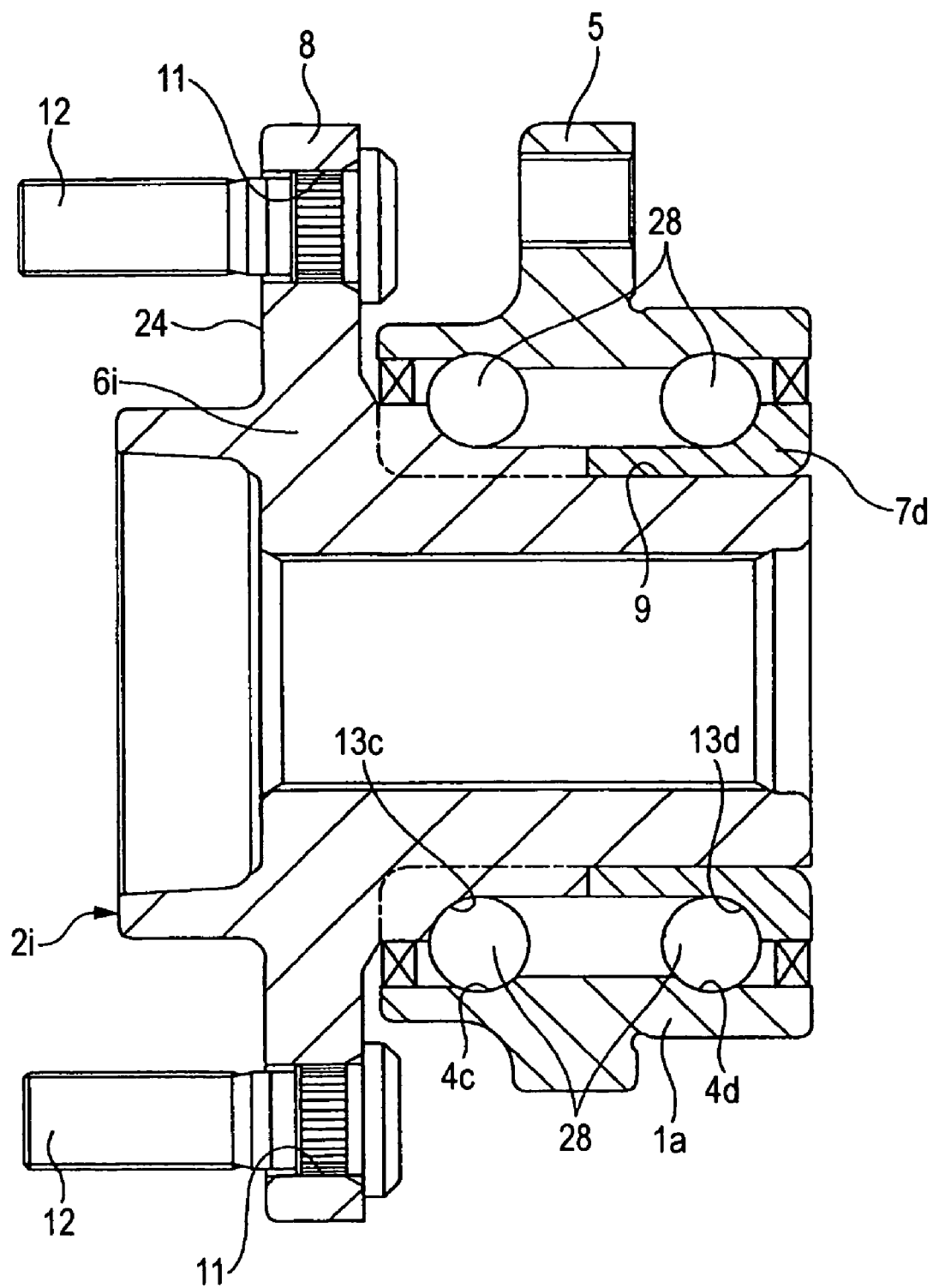
FIG. 26 is a sectional view showing a state in which a tenth example of a conventionally known wheel supporting bearing unit is assembled to the vehicle.
Figure 27:
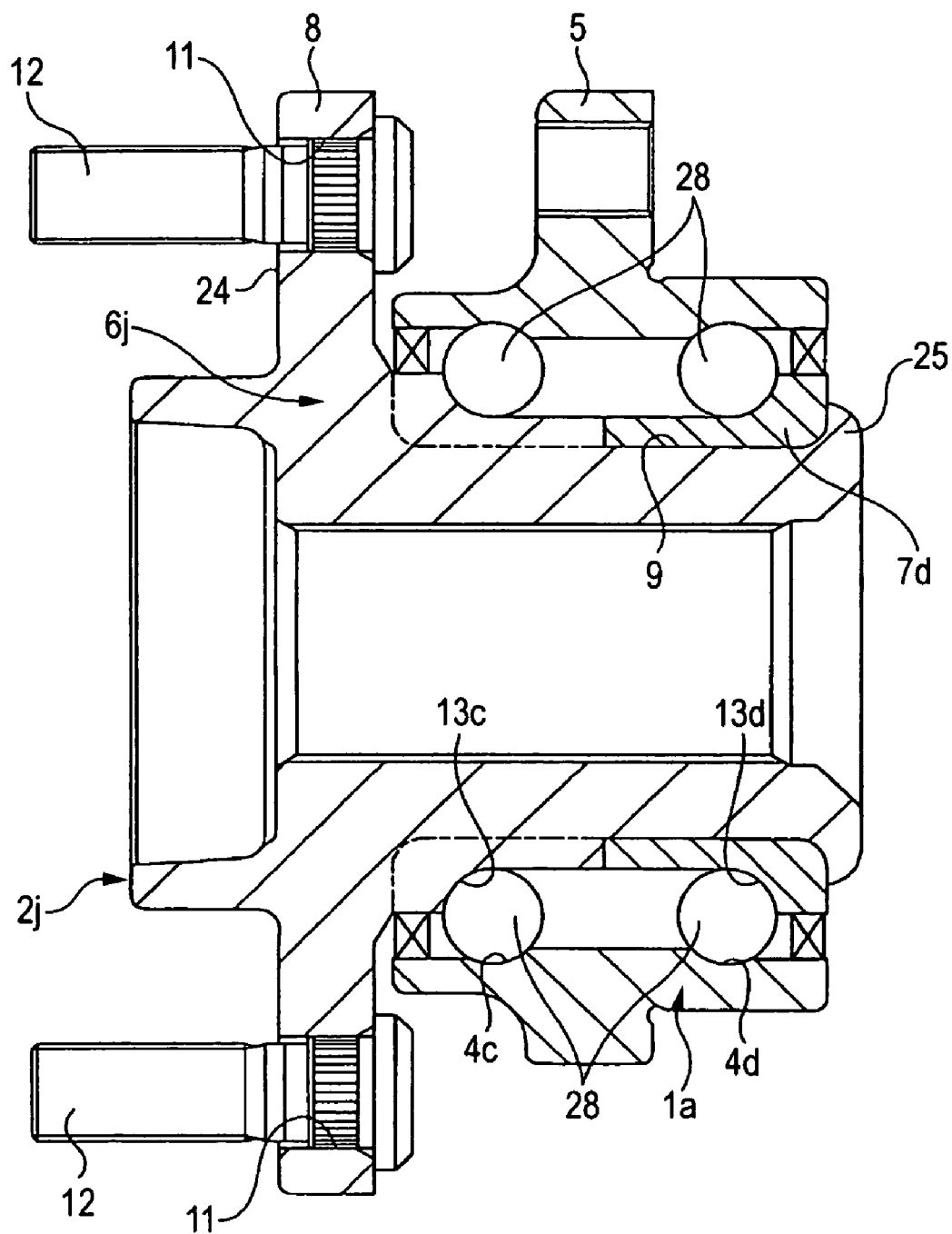
FIG. 27 is a sectional view showing a state in which a eleventh example of a conventionally known wheel supporting bearing unit is assembled to the vehicle.
Figure 28:
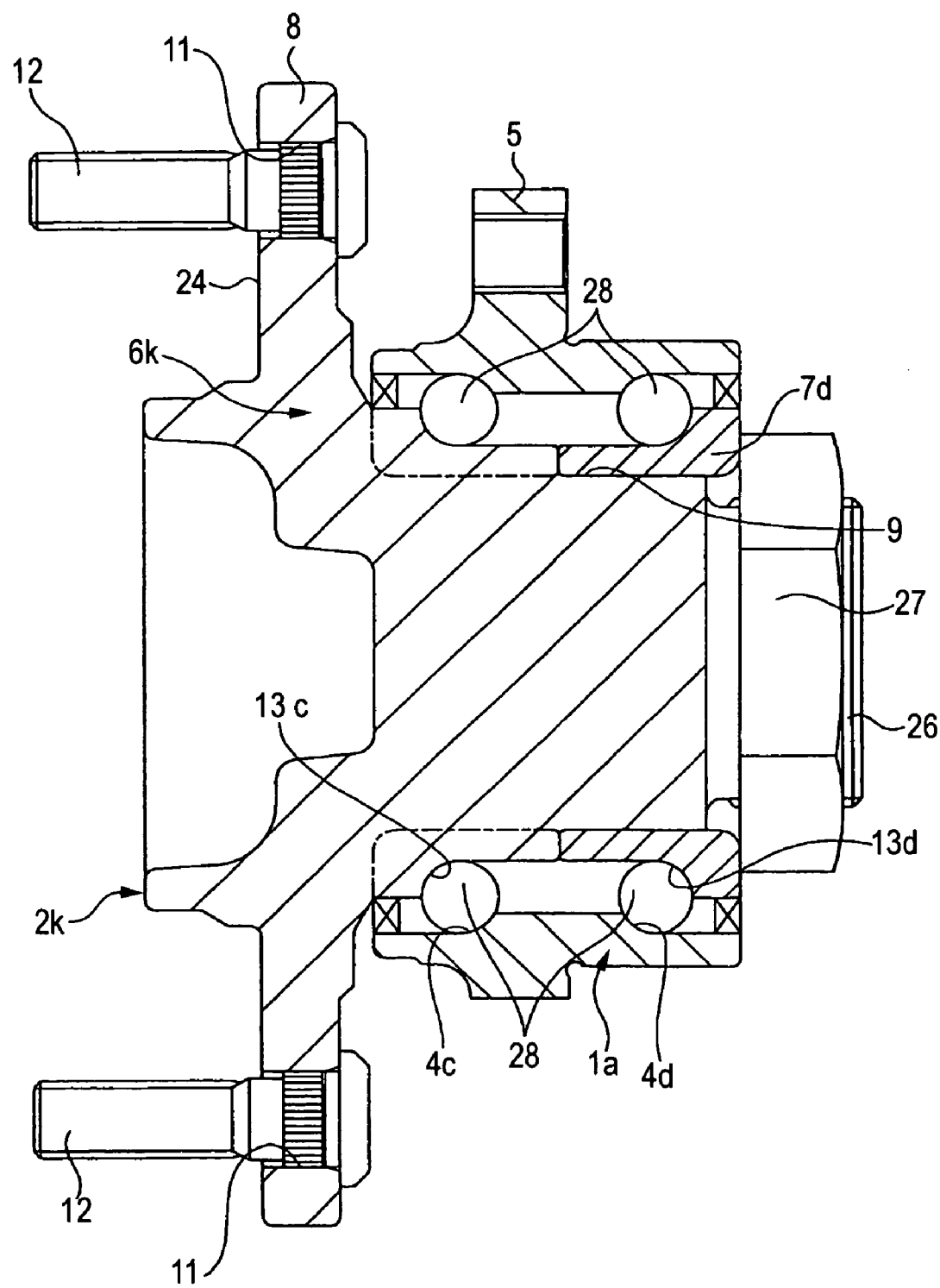
FIG. 28 is a sectional view showing a state in which a twelfth example of a conventionally known wheel supporting bearing unit is assembled to the vehicle.

Note that while in the embodiments that have been described heretofore, the wheel supporting bearing unit shown in FIG. 18 is made to be the target to be manufactured, the manufacturing method of the invention can be applied to, as a target thereof, various types of wheel supporting bearing units which satisfy the requirements of the claims of the invention such as the wheel supporting bearing units shown in FIGS. 17 and 10 to 28. For example, in the event that the primary inner ring raceways 7a, 7c are formed direct at the intermediate portion of the outer circumferential surface of the hub main body 6c to 6e, 6i to 6k as in the wheel supporting bearing units shown in FIGS. 20 to 22 and 26 to 28, in case grinding finishing work is applied to not only the cylindrical surface portion 9 of the hub main body 6c to 6e, 6i to 6k but also the primary inner ring raceways 7a, 7c (and the inner surface 21 of the large collar portion 15) on the same conditions as those of the embodiments that have been described above, the rotational run-out of the mounting surface 24 can also be suppressed sufficiently.

While the invention has been described in detail and by reference to the specific embodiments, it is obvious to those skilled in the art that various changes and modifications can be added without departing from the spirit and scope of the invention.

What is claimed is:

1. A method for manufacturing a wheel supporting bearing unit comprising:
   a hub comprising:
   a hub main body having an axially outboard portion, an axially intermediate portion, and an axially inboard portion;
   a mounting flange which is provided integrally on an outer circumferential surface of the axially outboard portion of the hub main body and to which a wheel and a brake rotary member are mounted;
   an axially outboard inner ring raceway which is formed directly on an outer circumferential surface of the axially intermediate portion of the hub main body; and
   an inner ring which is fitted on a cylindrical surface portion formed an outer circumferential surface of the axially inward portion of the hub main body;
   an axially inboard inner ring raceway formed on the inner ring,
   wherein the axially outboard inner ring raceway and the axially inboard inner ring raceway make up a double row inner ring raceway;
   an outer ring having a double row outer ring raceway on an inner circumferential surface thereof; and
   a plurality of rolling elements which are provided between the double row outer ring raceway and each of the inner ring raceways, respectively,
   the method for manufacturing the wheel supporting bearing unit comprising the steps of:
   (A) grinding a supporting surface provided on an axial end face of an inner ring supporting member, in a state of mounting the inner ring supporting member on a spindle adapted to be driven to rotate, while rotating the inner ring supporting member together with the spindle, to thereby improve perpendicularity of the supporting surface relative to a rotational center axis of the spindle, and
   grinding at least the axially inboard inner ring raceway formed on an outer circumferential surface of the inner ring and a cylindrical inner circumferential surface of the inner ring, respectively, in a state of abutting an axially end face of the inner ring with the supporting surface, while rotating the inner ring together with the spindle and the inner ring supporting member, or
   (B) grinding a supporting surface provided on an axial end face of a hub supporting member, in a state of mounting the hub supporting member on the spindle adapted to be driven to rotate, while rotating the hub supporting member together with the spindle, to thereby improve perpendicularity of the supporting surface relative to a rotational center axis of the spindle, and
   grinding at least the axially outboard inner ring raceway and the cylindrical surface portion onto which the inner ring is fitted, respectively, in a state of abutting an axially outboard surface of the mounting flange with the supporting surface, while rotating the hub main body together with the spindle and the hub supporting member.

2. The method for manufacturing the wheel supporting bearing unit as set forth in claim 1, wherein in at least one of the steps (A), (B), the supporting surface of the inner ring supporting member or the hub supporting member is grinded by a grinding wheel mounted on a grinding wheel shaft of a grinding machine which is used when grinding the inner ring or the hub main body which is a workpiece in one of the steps.

3. The method for manufacturing the wheel supporting bearing unit as set forth in claim 1, wherein supporting holes are provided at a plurality of locations in a circumferential direction of the mounting flange which lie equidistant from a center axis of the mounting flange, respectively, and rod-shaped members used to support the wheel and the brake rotary member are press fitted or screwed into the supporting holes, and
   wherein in the step (B), the supporting surface of the hub supporting member is abut with only a portion of an axially outboard surface of the mounting flange which lies radially further outwards than a pitch circle of the supporting holes and which lies radially further outwards than a portion of the outer circumferential surface of the hub main body to be grinded.

4. The method for manufacturing the wheel supporting bearing unit as set forth in claim 1, wherein the plurality of rolling elements are tapered rollers, respectively,
   a collar surface for guiding axial end edges of the tapered rollers is provided so as to extend around a full circumference of the inner ring raceway at each end portion of the double inner ring raceway, which are axially opposite to each other, and
   wherein in the steps (A) and (B), each of the double row inner ring raceways and the collar surfaces are grinded.

5. The method for manufacturing the wheel supporting bearing unit as set forth in claim 1, wherein the plurality of rolling element are balls.

6. A method for manufacturing a wheel supporting bearing unit comprising:
   a hub comprising:
   a hub main body having an axially outboard portion, an axially intermediate portion, and an axially inboard portion;
   a mounting flange which is provided integrally on an outer circumferential surface of the axially outboard portion of the hub main body and to which a wheel and a brake rotary member are mounted;
   a cylindrical surface portion which is formed on an outer circumferential surface of the hub main body from the axially intermediate portion to the axially inboard portion thereof;
   a primary inner ring which is fitted onto the cylindrical surface portion formed at the axially intermediate portion of the hub main body, an axially outboard inner ring raceway being formed on an outer circumferential surface of the primary inner ring; and a secondary inner ring which is fitted onto the cylindrical surface portion formed at the axially inboard portion of the hub main body, an axially inboard inner ring raceway being formed on an outer circumferential surface of the secondary inner ring, wherein the axially outboard inner ring raceway and the axially inboard inner ring raceway make up a double row inner ring raceway;

an outer ring having a double row outer ring raceway on an inner circumferential surface thereof; and a plurality of rolling elements which are provided between the outer ring raceway and each of the inner ring raceways, respectively, the method for manufacturing the wheel supporting bearing unit comprising the steps of:

(A) grinding a supporting surface provided on an axial end face of an inner ring supporting member, in a state of mounting the inner ring supporting member mounted on a spindle adapted to be driven to rotate, while rotating the inner ring supporting member together with the spindle, to thereby improve perpendicularity of the supporting surface relative to a rotational center axis of the spindle, and grinding at least the axially inboard inner ring raceway formed on an outer circumferential surface of the primary inner ring or the secondary inner ring and the cylindrical inner circumferential surface of the primary inner ring or the secondary inner ring, respectively, in a state of abutting an axially end face of the primary inner ring or the secondary inner ring with the supporting surface, while rotating the primary inner ring or the secondary inner ring together with the spindle and the inner ring supporting member, or (B) grinding a supporting surface provided on an axial end face of a hub supporting member, in a state of mounting the hub supporting member on the spindle adapted to be driven to rotate, while rotating the hub supporting member together with the spindle, to thereby improve perpendicularity of the supporting surface relative to a rotational center axis of the spindle, and grinding at least the cylindrical surface portions on which the primary and secondary inner rings are fitted, respectively, in a state of abutting an axially outboard surface of the mounting flange with the supporting surface, while rotating the hub main body together with the spindle and the hub supporting member.

7. The method for manufacturing the wheel supporting bearing unit as set forth in claim 6, wherein in at least one of the steps (A), (B), the supporting surface of the inner ring supporting member or the hub supporting member is grinded by a grinding wheel mounted on a grinding wheel shaft of a grinding machine which is used when grinding the inner ring or the hub main body which is a workpiece in the one of the steps.

8. The method for manufacturing the wheel supporting bearing unit as set forth in claim 6, wherein supporting holes are provided at a plurality of locations in a circumferential direction of the mounting flange which lie equidistant from a center axis of the mounting flange, respectively, and rod-shaped members used to support the wheel and the brake rotary member are press fitted or screwed into the support holes, and wherein in the step (B), the supporting surface of the hub supporting member abuts with only a portion of an axially outboard surface of the mounting flange which lies radially further outwards than a pitch circle of the supporting holes and which lies radially further outwards than a portion of the outer circumferential surface of the hub main body to be grinded.

9. The method for manufacturing the wheel supporting bearing unit as set forth in claim 6, wherein the plurality of rolling elements are tapered rollers, and a collar surface for guiding axial end edges of the tapered rollers is provided so as to extend around a full circumference of the inner ring raceway at each end portion of the double inner ring raceway, which are axially opposite to each other, and wherein in the steps (A) and (B), each of the double row inner ring raceways and also the collar surfaces are grinded.

10. The method for manufacturing the wheel supporting bearing unit as set forth in claim 6, wherein the plurality of rolling element are balls.

* * * * *